United States Patent
Ogura et al.

(10) Patent No.: US 6,271,902 B1
(45) Date of Patent: *Aug. 7, 2001

(54) COLOR FILTER SUBSTRATE HAVING OVERLAPPING COLOR LAYERS AND A COLOR LIQUID CRYSTAL DISPLAY DEVICE USING THE COLOR FILTER SUBSTRATE

(75) Inventors: Masami Ogura, Kashihara; Kazuya Yoshimura, Kitakatsuragi-gun, both of (JP)

(73) Assignee: Sharp Kabushiki Kaisha, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,133

(22) Filed: Jan. 21, 1998

(30) Foreign Application Priority Data

Jan. 21, 1997 (JP) .................................................. 9-009008
Jul. 7, 1997 (JP) .................................................. 9-181570

(51) Int. Cl.[7] ................................................ G02F 1/1335
(52) U.S. Cl. ............................ 349/106; 349/122; 349/110
(58) Field of Search ................................ 349/106, 107, 349/109, 155, 156

(56) References Cited

U.S. PATENT DOCUMENTS

| | | | |
|---|---|---|---|
| Re. 36,161 | * 3/1999 | Okubo et al. | 349/106 |
| 4,357,415 | * 11/1982 | Harman | 430/293 |
| 4,470,667 | * 9/1984 | Okubo et al. | 349/106 |
| 4,601,546 | * 7/1986 | Ohta | 349/3 |
| 4,776,675 | * 10/1988 | Takaochi et al. | 349/106 |
| 4,853,296 | * 8/1989 | Fukuyoshi | 428/623 |
| 5,493,429 | * 2/1996 | Kanemoto et al. | 349/106 |
| 5,500,751 | * 3/1996 | Takao et al. | 349/106 |
| 5,568,293 | * 10/1996 | Takao et al. | 349/106 |
| 5,786,042 | * 7/1998 | Inoue et al. | 428/1 |
| 5,850,271 | * 12/1998 | Kim et al. | 349/106 |
| 5,870,157 | * 2/1999 | Shimada et al. | 349/106 |
| 5,969,784 | * 10/1999 | Miyazaki et al. | 349/155 |

FOREIGN PATENT DOCUMENTS

| | | |
|---|---|---|
| 2-275903 | 11/1990 | (JP) . |
| 3-246503 | 11/1991 | (JP) . |
| 4-062504 | 2/1992 | (JP) . |
| 09 152 593 | 6/1997 | (JP) . |

OTHER PUBLICATIONS

Perettie et al, "BenzocycloGuten as a Planarization Overcoat for Flat Panel Displays", AS119 Display 1995.*

* cited by examiner

Primary Examiner—Kenneth Parker
(74) Attorney, Agent, or Firm—Nixon & Vanderhye P.C.

(57) ABSTRACT

A color filter substrate includes a substrate and coloring layers having at least two different colors, wherein the adjacent edge portions of the coloring layers are overlapped with each other, and the height of the overlapped portion is higher than or equal to the height of the other portion of the coloring layers.

25 Claims, 20 Drawing Sheets

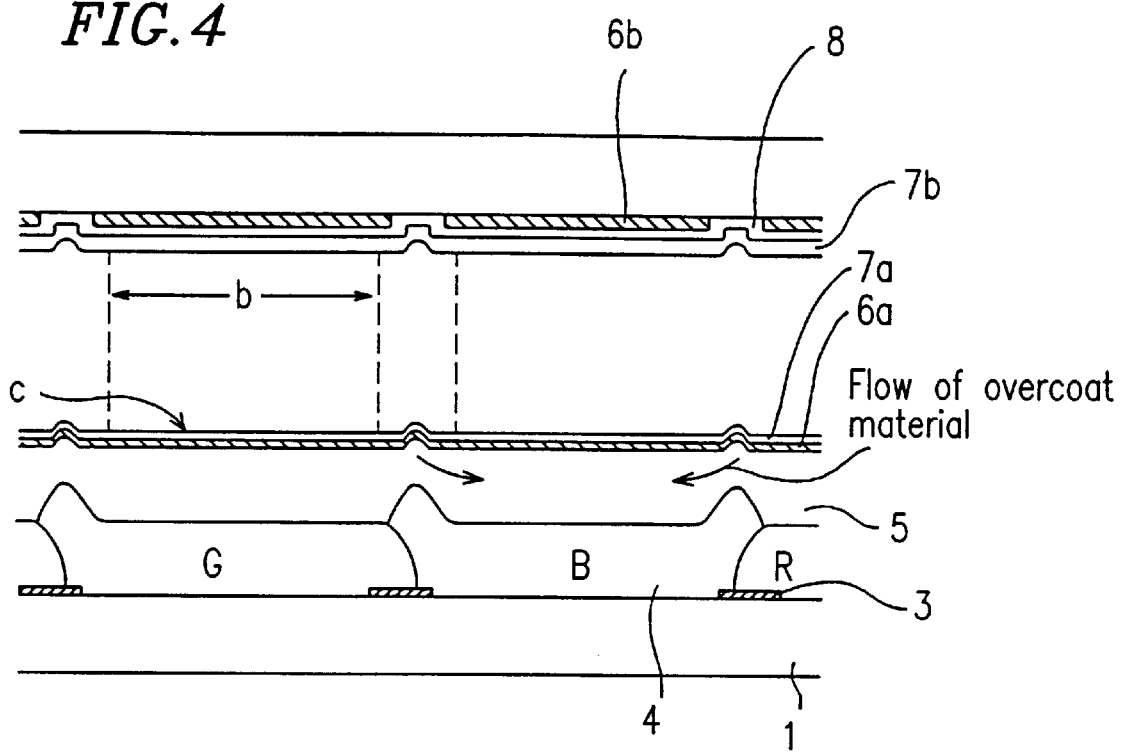

Gap difference between the center portion and the edge portion of the dot is small -- Portion in which color fades Portion in which light-leaking is observed Measurement point
(35point)

COLOR FILTER SUBSTRATE HAVING OVERLAPPING COLOR LAYERS AND A COLOR LIQUID CRYSTAL DISPLAY DEVICE USING THE COLOR FILTER SUBSTRATE

BACKGROUND OF THE INVENTION

1. Field of the Invention

The present invention relates to a color filter substrate and a color liquid crystal display device using the same, which is equipped in television sets, computers, word processors, office automation machines, and the like.

2. Description of the Related Art

FIG. 15 shows one example of a conventional color liquid crystal display device.

This color liquid crystal display device comprises a pair of substrates oppositely disposed to sandwich a liquid crystal layer 12. One of the substrates is a color filter substrate which comprises a glass substrate 1, and a light-shading member (a black mask) 3, a color filter coloring layer 4 and a smoothing layer (an overcoat layer) 5 formed on the glass substrate 1. Formed thereon are a display electrode 6a and an alignment film 7a. On the other glass substrate 2, a display electrode 6b an insulating film 8 and an alignment film 7b are formed. Both substrates 1 and 2 are attached together through a sealing material 10 containing glass beads 9 arranged along the periphery of the substrates, and plastic beads 11 for controlling a cell gap which are arranged between the substrates to form the liquid crystal layer 12 having a liquid crystal sealed in a gap between the glass substrates 1 and 2 surrounded by the sealing material 10. A counter portion of both display electrodes 6a and 6b which is not shaded by the light-shading member is a liquid crystal-lighting region.

The above-described color filter substrate is manufactured as shown in for example FIGS. 16A to 16I which illustrate a case where a metal film is used as the black mask 3.

First, a metal (chromium, etc.) film 3a is vacuum-deposited on the glass substrate 1 by sputtering or the like at a thickness of approximately 1000 angstroms, as shown in FIG. 16A, and a resist 13 is coated thereon, as shown in FIG. 16B. Then, the resist 13 is exposed using a photomask 14, as shown in FIG. 16C, and developed to form a resist pattern 13a as shown in FIG. 16D. Thereafter, it is etched to form a black mask 3, as shown in FIG. 16E.

Then, a coloring layer 15 is formed, as shown in FIG. 16F. The coloring layer 15 is formed on the whole surface of the substrate by coating a pigment-containing organic ink, or transferring a pigment-containing photo-sensitive resin. Subsequently, the coloring layer 15 is exposed using a photomask 16, as shown in FIG. 16G, and developed to form a color filter coloring layer 4 (a coloring layer corresponding to an R (red) pixel in this figure) in a dot shape, as shown in FIG. 16H. Similarly, coloring layers corresponding to G (green) and B (blue) pixels are formed in a dot shape. Additionally, a printing method may be used which comprises printing a pigment-containing organic ink on the prescribed region of the substrate for forming a color filter coloring layer.

Thereafter, an overcoat layer 5 is formed by a spin coating method or a printing method so as to improve the smoothness of the surface of the color filter substrate and to ensure its adhesive force to the display electrodes, as shown in FIG. 16I.

A common method of improving the surface smoothness of the color filter substrate comprises mechanically polishing the surface of the color filter substrate, or ameliorating the leveling ability of the overcoat material, as disclosed in Japanese Laid-open Patent Publications Nos. 2-275903 and 3-246503. Also, it includes forming adjacent coloring layers in such a manner so as not to overlap with each other in the formation of the color filter coloring layers corresponding to each of R, G and B pixels in a dot shape, or forming a light-shading member between adjacent coloring layers as sandwich thereof both sides, for fear of the unevenness of a liquid crystal domain and a cell thickness as well as the generation of color mixture, and the like. That is, a gap (a concave portion) 24 is commonly created between the adjacent coloring layers 4, as shown in FIG. 18. In FIG. 18, a indicates a cell thickness difference, b indicates a liquid crystal-lighting display region, and c and d indicate a pixel center portion and a pixel edge portion of the liquid crystal display region, respectively.

When the above-described color filter coloring layer is formed via a process of exposing, developing, baking and the like, the UV light is refracted toward the unwanted portion in the exposure to the coloring layer 15 to form a light-leaking region e which creates an overexposure portion f, as shown in FIG. 17A. Thus, an over-exposure portion 14a remains in the etching, as shown in FIG. 17B. Then, the pixel edge portion including the over-exposure portion 14a is thermally deformed by baking to form a coloring layer having round edge portions 14b with a barrel-shaped section at the time of the completion of the baking, as shown in FIG. 17C. When a smoothing film is formed thereon, the barrel-shaped portions are levelled to create a further difference in level.

Also, when a color filter coloring layer is formed by a printing method, the section of the coloring layer is barrel-shaped due to the surface tension of the printed coloring layer as having round edge portions similar to that shown in FIG. 17C, as found in for example Japanese Laid-open Patent Publication No. 4-62504. Thus, a gap (a concave portion) 24 is created between the adjacent coloring layers 4, as shown in FIG. 18. Moreover, in this case, the edge portions are not straight, but disoriented.

In recent years, liquid crystal display devices which permit animation operations, highly precise displays such as SVGA, XGA, etc., and large-screen displays in accordance with the development of multimedia personal computers, and large-scale liquid crystal display devices which can be adapted for CRT-substituted desk top computers have been demanded in the market. In order to meet these demands, a liquid crystal display device, especially a color liquid crystal display device using a STN(super twisted nematic)-type liquid requires such characteristics as high contrast, high brightness, high speed response, high display quality, low power consumption, and the like, for example, such characteristics as a contrast of 30:1 or more and a response speed of 200 ms or less, and the like. In order to accomplish these demands, it is necessary that the steepness of the liquid crystal (hereinafter referred to as an α value) be improved for the high contrast and high brightness, that the surface of the color filter substrate be uniform for the high display quality, and that the consumed current of the back light due to the high brightness be reduced for low power consumption. Also, it is demanded that the surface smoothness of the color filter substrate as well as its sectional shape (barrel-shaped) be improved for the improvement of all of these.

However, the above-mentioned conventional color filter substrate suffers from the following problems in the improvement of the contrast. That is, as shown in FIG. 18, a gap (a concave portion) 24 exists between the color filter coloring layers 4, and allows an overcoat material to flow into the gap 24 in the formation of the overcoat layer 5 to not only provide insufficient surface smoothness of the color filter substrate, but create a barrel-shaped section. Thus, a cell thickness difference a is created in a liquid crystal lighting display region b sandwiched by the display electrodes 6a and 6b. Since the cell thickness in the pixel edge portion d is increased by a compared to that of the pixel center portion c, a difference occurs in the V(voltage)–T (transmittance) curve between the pixel edge portion d and the pixel center portion c, as shown in FIG. 19. For that reason, when the portion c is at a state of $V_{off}$, the portion d is nearly at a state of $T_{on}$ which allows the light to pass through so that the contrast is not improved. Also, a method of improving the steepness (i.e., lowering the α value) of the liquid crystal has been proposed so as to improve the contrast, but there is such a problem in a STN-type liquid crystal that the reduced α value of the liquid crystal causes a number of uneven display to deteriorate the display quality. That is, when the behavior of the liquid crystal is steepened, it is susceptible to the surface condition. For that reason, there is a limit of lowering the α value of the liquid crystal, in the case where a cell thickness difference occurs due to an insufficient surface smoothness of the color filter substrate which is contacted with the liquid crystal as well as a poor sectional shape of the color filter substrate.

Also, it is necessary to increase $T_{on}$ in the V–T curve of FIG. 19 for improving the brightness, but $T_{on}$ is correlated with the contrast, and thus it is necessary to increase a distance between $T_{on}$ and $T_{off}$ which is a dynamic range for improving the brightness as the contrast is $T_{on}/T_{off}$. However, because a difference occurs in the V–T curve shown in FIG. 19 due to the cell thickness difference a between the pixel center portion c and the pixel edge portion d as discussed above, a substantial dynamic range will be lowered in composing the V–T curve so that the transmittance which is the brightness is not improved. Moreover, since the low power consumption is achieved by increasing the brightness above the intended level and reducing the tube current of the back light by the same level, the power consumption cannot be reduced without the improvement of the brightness.

Also, it is necessary to ameliorate the surface smoothness as well as sectional shape of the color filter substrate for the improvement of the response speed and the display quality. Particularly, since the cell thickness is reduced for the high response speed (for example, from 6 μm to 5 μm or 4 μm), a ratio of the gap of the surface unevenness (such as the difference in level) to the entire cell thickness will be greater. Thus, it is necessary to further improve the surface smoothness as well as sectional shape of the color filter substrate.

Moreover, when the conventional color filter substrate as shown in FIG. 18 is mechanically polished to smooth its surface, the surface of the barrel-shaped portion can be smoothed to some extent, but the concave portion 24 cannot be improved. On the other hand, when the surface is polished too much, even the color filter coloring layer 4 varies in thickness which may cause the variation of its characteristics such as hue, and the like. Also, the improvement of the leveling ability of the overcoat material is less effective for the conventional color filter substrate as shown in FIG. 18, and it is difficult to accomplish the intended surface smoothness in the liquid crystal lighting display region which is within ±0.01 μm.

SUMMARY OF THE INVENTION

A color filter substrate of the present invention includes a substrate and coloring layers having at least two different colors, wherein the adjacent edge portions of the coloring layers are overlapped with each other, and the height of the overlapped portion is higher than or equal to the height of the other portion of the coloring layers.

In one embodiment of the present invention, the overlapped portion has a width of 2 μm or more.

In another embodiment of the present invention, the above-mentioned color filter substrate further includes a light-shading member.

In another embodiment of the present invention, the light-shading member has a thickness of 1 μm or less.

In another embodiment of the present invention, the light-shading member has a thickness of 0.5 μm or less.

In another embodiment of the present invention, the above-mentioned color filter substrate further includes a smoothing layer covering the coloring layers, wherein the whole surface of the smoothing layer or a surface portion of the smoothing layer other than the surface corresponding to the overlapped portion is flattened.

In another embodiment of the present invention, the whole surface of the coloring layers and the smoothing layer is flattened by polishing the overlapped portion and/or a portion of said smoothing layer formed on the overlapped portion.

In another embodiment of the present invention, the coloring layers contain coloring materials and a photosensitive resin, and are formed by a repeated photolithography.

A color liquid crystal display device of the present invention includes the above-mentioned color filter substrate, a counter substrate and a liquid crystal layer.

In one embodiment of the present invention, the liquid crystal layer contains a STN-type liquid crystal having a liquid crystal molecule twist angle of 180° to 360°.

A color liquid crystal display device of the present invention includes the above-mentioned color filter substrate further including a light-shading member, a counter substrate and a liquid crystal layer.

In one embodiment of the present invention, the liquid crystal layer contains a STN-type liquid crystal having a liquid crystal molecule twist angle of 180° to 360°.

A color liquid crystal display device of the present invention includes the above-mentioned color filter substrate further including a smoothing layer covering the coloring layers, a counter substrate and a liquid crystal layer.

In one embodiment of the present invention, the liquid crystal layer contains a STN-type liquid crystal having a liquid crystal molecule twist angle of 180° to 360°.

The following illustrates the functions of the present invention.

Since the edge portions of the adjacent coloring layers are overlapped and the height of the overlapped portion is greater than (a convex portion) or equal to (a flat portion) the other portion, no concave portion is formed in the pixel edge portion.

If the width of the overlapped portion is 2 μm or more, a sufficient overlapped degree is attained and no concave portion is formed in the pixel edge portion.

If the width of the overlapped portion is less than that of the light-shading member (a black mask), the coloring layers are not overflown to cause color mixture.

When a light-shading member is formed as overlapping the overlapped portion, the maximum height of the overlapped portion is the thickness of the coloring layer×2 plus the thickness of the light-shading member. A greater height of the overlapped portion leads to a bigger convex portion in the overlapped portion to create a bigger concave portion in a portion of the coloring layer other than the overlapped portion which causes the variation of the cell thickness in the formation of a liquid crystal display device. It is impossible to reduce the thickness of only the overlapped portion of the coloring layer, but it is possible to lower the height of the overlapped portion by reducing the thickness of the light-shading member. For example, when the thickness of the light-shading member is 1 $\mu$m or less, a stable display can be obtained in a liquid crystal display device having an ordinary cell thickness. Also, when the thickness of the light-shading member is 0.5 $\mu$m or less, a stable display can be obtained even in a liquid crystal display device having a smaller cell thickness, which makes it possible to provide a high speed response.

When an overcoat material is applied and pre-baked on the coloring layer, the overcoat material is flown along with the unevenness of the lower surface. At that time, if the overlapped portion of the coloring layer forms a convex portion, that portion plays a bank role and allows the overcoat material to flow toward the center of the pixel. Since the overcoat material does not flow into the concave portion of the pixel edge portion to deteriorate the surface smoothness unlike the conventional color filter substrate, it can exhibit its leveling ability effectively. Since the whole surface of the smoothing layer (the overcoat layer) or a portion of the surface other than the overlapped portion of the coloring layer is flattened, no concave portion is formed in the pixel edge portion.

Since the height of the coloring layer is maximum in the overlapped portion, the surface of most portions of the pixel can be flattened by polishing this portion without altering the thickness of the coloring layer. Also, since the height of the overcoat layer is maximum in the overlapped portion of the coloring layer, the surface of most portions of the pixel can be flattened by polishing this portion without altering the thickness of the coloring layer.

When the coloring layer is formed by a photolithography process, it is possible to provide a precision of ±2 $\mu$m from the designed value with the formation precision of the existing photomask, the development contrast of the photosensitive material, and the precision of the exposure device. Also, when the coloring layer is formed by a printing method, since it can be printed in response to the pixel dots, such processes as exposure and developing are unnecessary.

Since the color liquid crystal display device of the present invention uses the color filter substrate of the present invention, no concave portion is formed on the surface of the pixel edge portion of the color filter substrate by overlapping the edge portions of the adjacent coloring layers and adjusting the width of the overlapped portions. Since the cell thickness is not increased in the concave portion of the pixel edge portion, unlike the conventional color filter substrate, and a difference in the V–T curve does not occur even by applying a liquid crystal driving voltage, it is possible to prevent the reduction of the contrast as well as display quality. Also, the extension of the tailing region of the overlapped portion can be adjusted by controlling the overlapped width of the coloring layers on the light-shading member. Thus, it is possible to control the smoothness of the entire portion which will be the liquid crystal-lighting display region when applying a liquid crystal driving voltage. Also, the formation of the overcoat layer on the coloring layer will smooth the surface of the color filter substrate in the entire pixel portion as effectively exhibiting the leveling ability, and also reduce a difference in the heights of the pixel center portions between the adjacent coloring layers. Moreover, since it is not necessary to polish even the lowest portion of the concave portion in polishing the surfaces of the coloring layer and the overcoat layer unlike the conventional color filter substrate, the surface smoothness of most portions of the pixel portion including the pixel center portion can be improved without any variation of the characteristics.

Since it is possible to adjust a difference in level of the adjacent coloring layers to 0.01 $\mu$m or less and to maximize the leveling ability of the overcoat layer in the color filter substrate, a uniform surface can be obtained with no concave portion in the liquid crystal-lighting display region. Therefore, good optical characteristics and display quality can be obtained, even when using an STN liquid crystal of which the optical characteristics and display quality are largely affected by the variation of the cell thickness and the uniformity of the surface.

Thus, the invention described herein makes possible the advantages of: (1) providing a color filter substrate having good surface smoothness; and (2) providing a color liquid crystal display device having excellent optical properties as well as display quality.

These and other advantages of the present invention will become apparent to those skilled in the art upon reading and understanding the following detailed description with reference to the accompanying figures.

BRIEF DESCRIPTION OF THE DRAWINGS

FIG. 4 is a sectional view showing the liquid crystal display device of the present invention.

The color filter substrate of the present invention comprises a substrate and coloring layers having two or more different colors formed on the substrate as overlapping the edge portions of the adjacent coloring layers. Since the surface of the overlapped portion is raised and the edge portion is higher than or equal to the other portions, no concave portion is formed therein. Additionally, the following illustrates a case where each of the coloring layers R, G and B is formed, but other coloring layers having two or more different colors may also be used.

Figure 1:
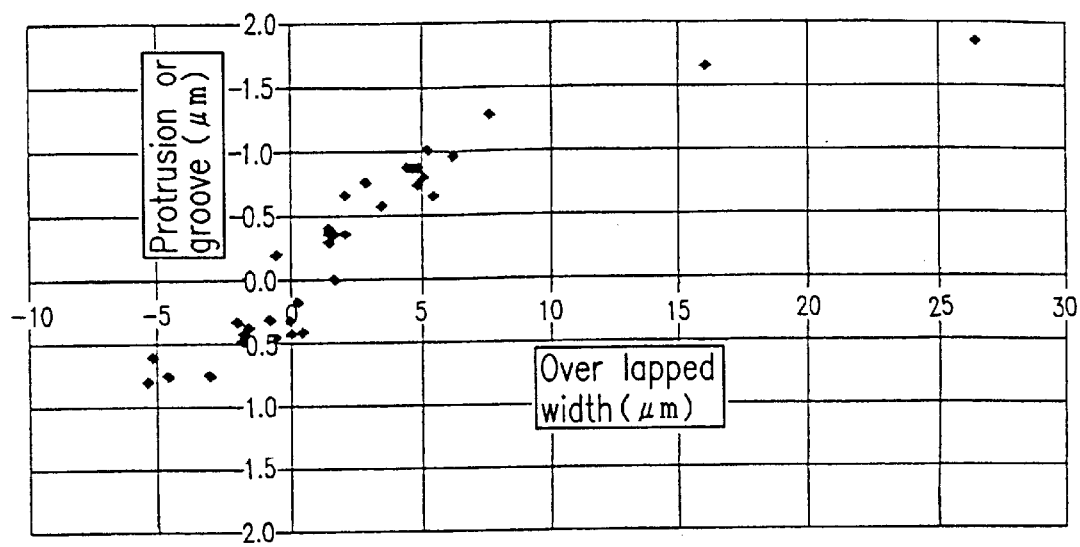
FIG. 1 is a graph showing a relationship between the overlapped width and height of the coloring layer in the color filter substrate of the present invention.

FIG. 1 and the following Table 1 show the measurement results of the height of the overlapped portion of the coloring layers as varying the width of the adjacent coloring layers. In this case, the overlapped widths of the adjacent coloring layers (RG, GB and GR) are varied by the pixel width of the stripe-shaped coloring layers (R, G and B) having a round sectional shape in the pixel edge portion and a barrel sectional shape in the whole layer. A pair of such color filters are fabricated and the heights of the protrusion (convex portion), groove (concave portion) and flat surface of the overlapped portion are measured in 11 points, compared to that of the coloring layer other than the overlapped portion.

TABLE 1

|  | First color filter substrate | | | | | | Second color filter substrate | | | | | |
|---|---|---|---|---|---|---|---|---|---|---|---|---|
|  | RG | | GB | | BR | | RG | | GB | | BR | |
|  | Height | Overlapped width | Height | Overlapped width | Height | Overlapped width | Height | Overlapped width | Height | Overlapped width | Height | Over-lapped width |
| point.1 | 0.66 | 2.0 | 0.96 | 6.2 | −0.76 | −3.0 | 0.88 | 4.8 | 1.83 | 36.6 | Light is completely leaked | |
| point.2 | 0.36 | 1.4 | 1.01 | 5.2 | −0.81 | −5.4 | — | — | — | — | — | — |
| point.3 | 0.30 | 1.4 | 0.88 | 4.4 | −0.62 | −5.2 | — | — | — | — | — | — |
| point.4 | 0.00 | 1.6 | 0.58 | 3.4 | −0.42 | 0.4 | — | — | — | — | — | — |
| point.5 | 0.36 | 1.6 | 0.80 | 5.0 | −0.18 | 0.2 | 0.36 | 2.0 | 1.86 | 26.4 | Light is completely leaked | |
| point.6 | 0.00 | 1.6 | 0.41 | 1.4 | −0.32 | 0.0 | — | — | — | — | — | — |
| point.7 | −0.32 | −0.8 | −0.43 | 0.0 | 0.74 | 4.8 | — | — | — | — | — | — |
| point.8 | −0.38 | −1.6 | −0.34 | −2.0 | 0.65 | 5.4 | — | — | — | — | — | — |
| point.9 | −0.45 | −0.6 | −0.43 | −1.8 | 0.87 | 4.6 | −0.77 | −4.6 | 1.29 | 7.6 | −0.55 | 0.2 |
| point.10 | 0.55 | 1.7 | 0.87 | 5.0 | −0.44 | −2.0 | 0.76 | 2.8 | 1.84 | 31.8 | Light is completely leaked | |
| point.11 | −0.34 | 0.3 | 0.00 | 2.6 | 0.43 | 2.6 | −0.48 | −1.8 | 1.66 | 16.0 | −1.48 | −9.2 |
| Ave. | 0.07 | 0.8 | 0.39 | 2.7 | −0.08 | 0.2 | 0.15 | 0.6 | 1.70 | 23.7 | −1.02 | −4.5 |
| Max. | 0.66 | 2.0 | 1.01 | 6.2 | 0.87 | 5.4 | 0.88 | 4.8 | 1.86 | 36.6 | −0.55 | 0.2 |
| Min. | −0.45 | −1.6 | −0.43 | −2.0 | −0.81 | −5.4 | −0.77 | −4.6 | 1.29 | 7.6 | −1.48 | −9.2 |

(μm)

Figure 23:
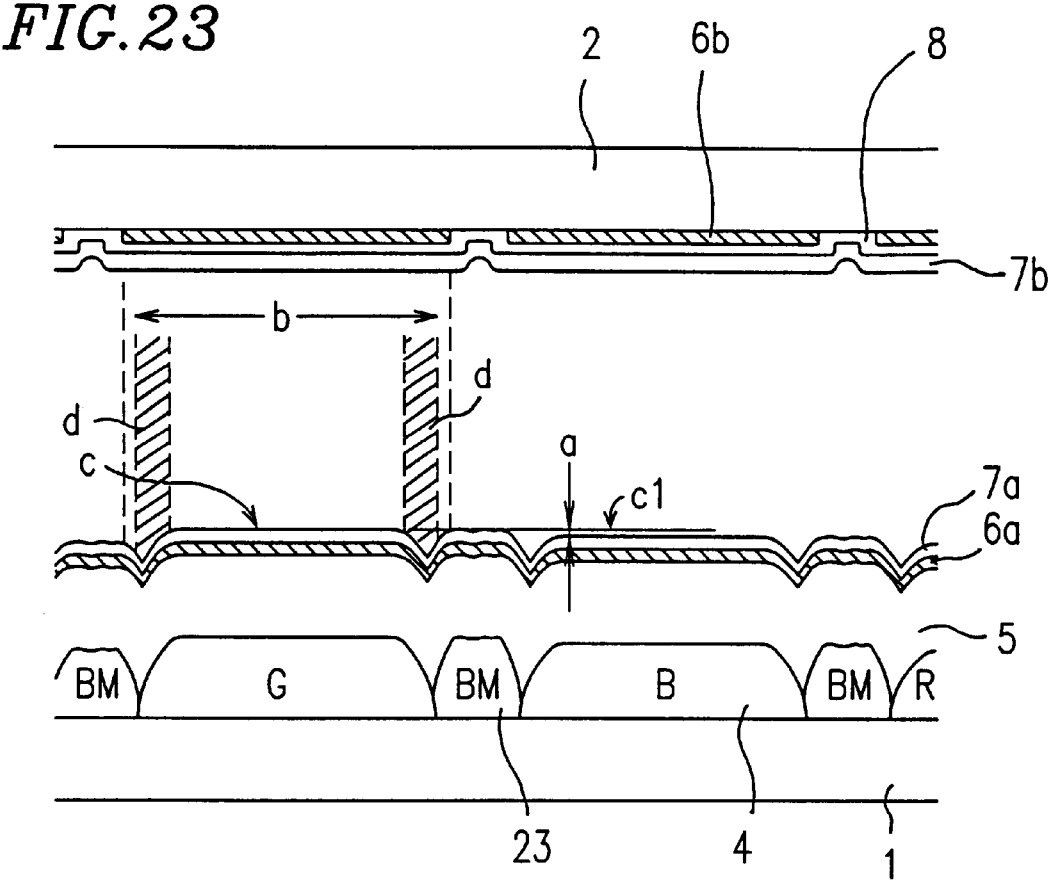

FIG. 23 is a sectional view showing the color liquid crystal display device of a comparative example.

Figure 24:
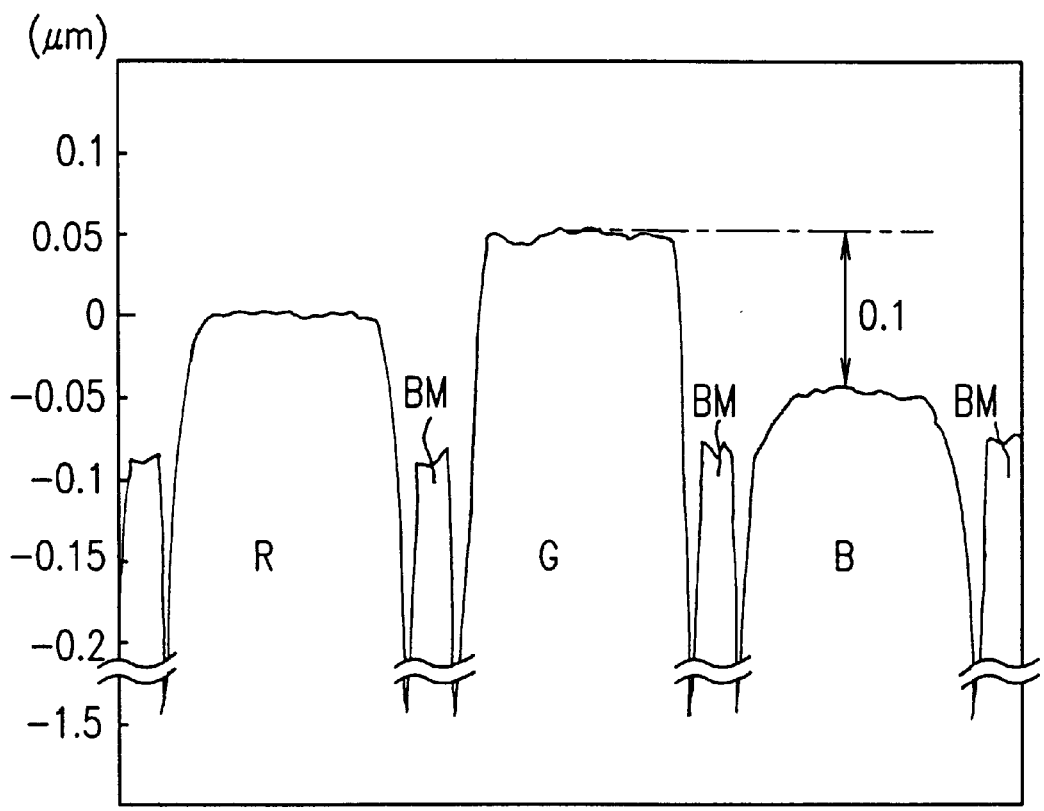

FIG. 24 is a sectional view showing the coloring layer of the color liquid crystal display device of a comparative example.

Figure 25:
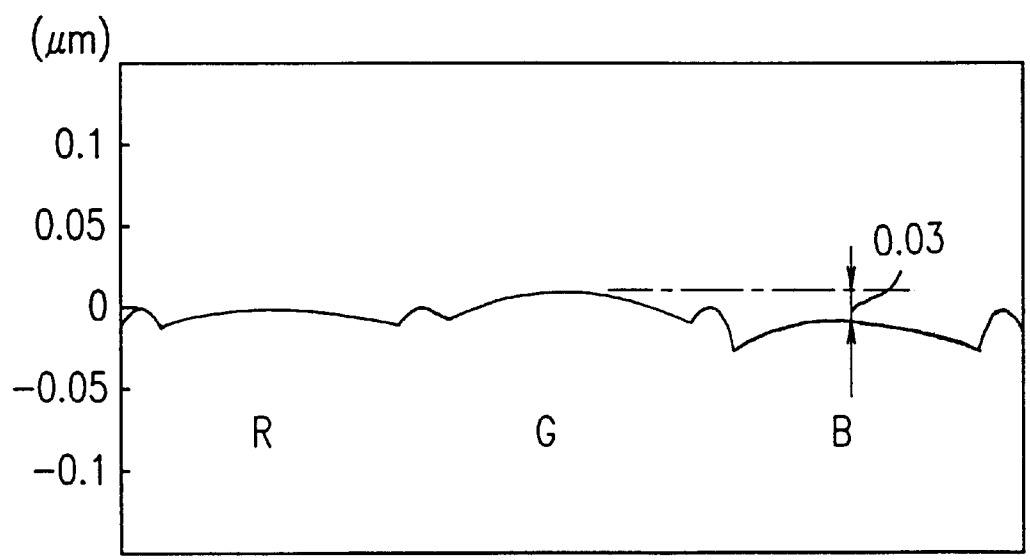

FIG. 25 is a sectional view showing the overcoat layer of the color liquid crystal display device of a comparative example.

DESCRIPTION OF THE PREFERRED EMBODIMENTS

The following illustrates the embodiments of the present invention.

It can be seen from FIG. 1 and Table 1 that if the overlapped width is less than 2 μm, the coloring layers may not be sufficiently overlapped and thus a concave portion is formed on its surface. Therefore, it is preferred that the overlapped width of the coloring layers be 2 μm or more to avoid the formation of the concave portion on the surface of the overlapped portion (the pixel edge portion).

If a light-shading member (a black mask) is formed as overlapping the overlapped portion of the coloring layers, the overlapped portion can be shaded by the light-shading member. When the width of the overlapped portion exceeds the width of the light-shading member, the coloring layers overflow into the adjacent pixels to cause display defects due to the color mixture. Thus, it is preferred that the width of the overlapped portion be less than that of the light-shading member. In this case, the light-shading member may be formed on the substrate, and then the coloring layers may be formed so that the overlapped portion is located on the light-shading member. Also, the coloring layers may be formed on the substrate, and then the light-shading member may be formed on its overlapped portion.

When a light-shading member is formed as overlapping the overlapped portion, the maximum height of the overlapped portion is the thickness of the coloring layer×2 plus the thickness of the light-shading member. A greater height of the overlapped portion leads to a bigger convex portion in the overlapped portion. Since the tailing portion of the convex portion is necessarily greater, a portion of the coloring layers not corresponding to the overlapped portion becomes a larger concave portion which leads to the variation of the cell thickness in the formation of a liquid crystal display device which contributes to the variation of the optical characteristics as well as the reduction of the display quality. It is impossible to reduce the thickness of only the overlapped portion corresponding to the coloring layers, since the coloring layers are made from the same material as those of the pixel center portion and the pixel edge portion, but it is possible to lower the height of the overlapped portion by reducing the thickness of the light-shading member. When the liquid crystal domain and the focal conic are evaluated as varying the thickness of the light-shading member at 1.5 μm, 1.4 μm, 1.3 μm, 1.2 μm, 1.1 μm, 1.0 μm and 0.9 μm, a thickness of the light-shading member for providing a stable display is 1.0 μm or less. Also, when the liquid crystal domain and the focal conic are evaluated as varying the thickness of the cell at 6 μm, 5 μm and 4 μm, a thickness of the light-shading member for providing a stable display is 0.5 μm or less. Therefore, it is preferred that the thickness of the light-shading member be 1 μm or less, or 0.5 μm or less in a liquid crystal display device having a cell thickness reduced for providing a high speed response.

When an overcoat material is applied and pre-baked on the coloring layer before the main baking step, the overcoat material flows along with the unevenness of the lower surface to lessen the unevenness. At that time, if the overlapped portion (the pixel edge portion) of the coloring layer forms a convex portion, that convex portion plays a bank role and allows the overcoat material to flow toward the center of the pixel to smooth the surface of the pixel portion. Since the overcoat material does not flow into the concave portion of the pixel edge portion to deteriorate the surface smoothness unlike the conventional color filter substrate, the leveling ability can effectively be exhibited to improve the surface smoothness of the pixel portion.

Figure 2:
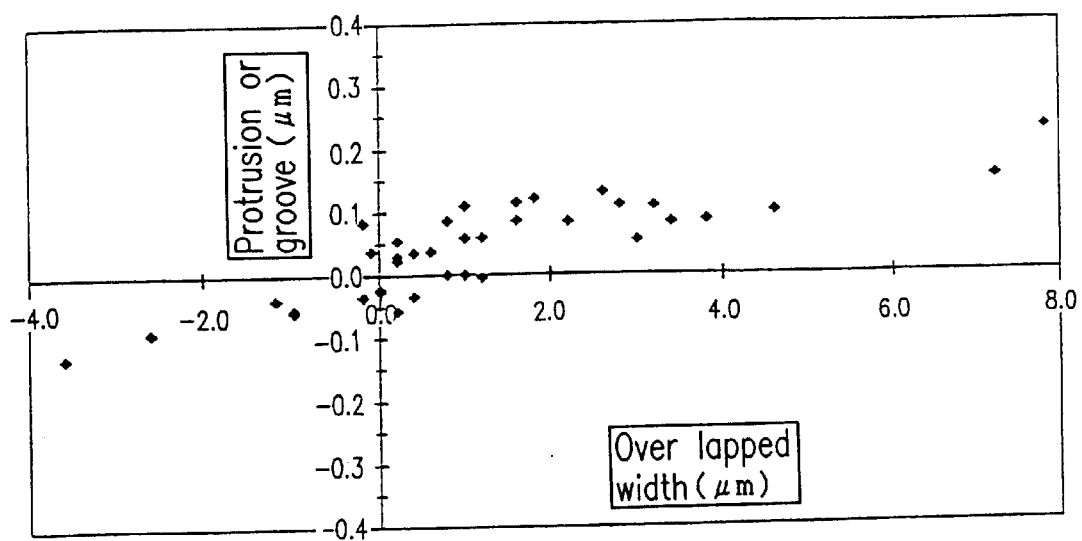
FIG. 2 is a graph showing a relationship between the overlapped width of the coloring layer and the height of the overcoat layer in the color filter substrate of the present invention.

FIG. 2 and the following Table 2 show the measurement results of the height of the overcoat layer formed on the overlapped portion as varying the overlapped width of the adjacent coloring layers and forming the overcoat layer covering them. As with FIG. 1 and Table 1, the overlapped widths of the adjacent coloring layers (RG, GB and GR) are varied by the pixel width of the stripe-shaped coloring layers (R, G and B) having a round sectional shape in the pixel edge portion and a barrel sectional shape in the whole layer. A pair of such color filters are fabricated and the heights of the protrusion (convex portion), groove (concave portion) and flat surface of the overlapped portion are measured in 11 points compared to that of the coloring layer other than the overlapped portion.

TABLE 2

| | First color filter substrate | | | | | | Second color filter substrate | | | | | |
|---|---|---|---|---|---|---|---|---|---|---|---|---|
| | RG | | GB | | BR | | RG | | GB | | BR | |
| | Height | Overlapped width | Height | Overlapped width | Height | Overlapped width | Height | Overlapped width | Height | Overlapped width | Height | Overlapped width |
| point.1 | 0.11 | 2.8 | 0.13 | 2.6 | −0.02 | 0.0 | 0.11 | 1.6 | 0.23 | 7.8 | −0.13 | −3.6 |
| point.2 | 0.00 | 1.0 | 0.12 | 1.8 | −0.09 | −2.6 | — | 1.6 | — | 6.0 | — | −4.8 |
| point.3 | 0.06 | 1.0 | 0.11 | 1.0 | −0.06 | −1.0 | — | 1.2 | — | 5.8 | — | −3.4 |
| point.4 | 0.08 | 2.2 | 0.09 | 0.8 | 0.04 | 0.4 | — | 0.6 | — | 6.2 | — | −1.4 |
| point.5 | 0.09 | 1.6 | 0.11 | 3.2 | 0.06 | 1.2 | 0.00 | 1.2 | 0.15 | 7.2 | −0.06 | 0.2 |
| point.6 | 0.00 | 0.8 | 0.05 | 0.2 | 0.04 | 0.6 | — | 1.0 | — | 1.4 | — | −0.8 |
| point.7 | −0.03 | −0.2 | 0.08 | −0.2 | 0.09 | 3.8 | — | −1.2 | — | 1.4 | — | 3.0 |
| point.8 | −0.06 | −1.0 | 0.03 | 0.2 | 0.08 | 3.4 | — | −1.4 | — | 0.6 | — | 3.2 |
| point.9 | −0.04 | −1.2 | 0.02 | 0.2 | 0.10 | 4.6 | −0.03 | 0.4 | 0.04 | −0.1 | 0.05 | 3.0 |
| point.10 | 0.08 | 1.9 | 0.10 | 2.1 | 0.00 | −0.3 | 0.02 | 1.3 | 0.21 | 6.8 | −0.12 | −2.4 |
| point.11 | −0.04 | 0.1 | 0.00 | 1.0 | 0.07 | 2.5 | −0.01 | 0.3 | 0.08 | 2.3 | 0.06 | 1.4 |
| Ave. | 0.02 | 0.8 | 0.08 | 1.2 | 0.03 | 1.1 | 0.02 | 0.6 | 0.14 | 4.1 | −0.04 | −0.5 |
| Max. | 0.11 | 2.8 | 0.13 | 3.2 | 0.10 | 4.6 | 0.11 | 1.6 | 0.23 | 7.8 | 0.06 | 3.2 |
| Min. | −0.06 | −1.2 | 0.00 | −0.2 | −0.09 | −2.6 | −0.03 | −1.4 | 0.04 | −0.1 | −0.13 | −4.8 |

(μm)

It can be seen from FIG. 2 and Table 2 that if the overlapped width of the adjacent coloring layers is less than 2 μm, the coloring layers may not be sufficiently overlapped and thus a concave portion is formed on its surface while the overcoat layer (the pixel edge portion) on the overlapped portion forms a convex portion.

Since no concave portion is formed on the overcoat layer in the pixel edge portion as described above, a cell thickness difference is not created in the concave portion of the pixel edge portion to differentiate the initiation of the liquid crystal cell unlike the conventional color filter substrate. Also, since the overcoat material does not flow into the concave portion of the pixel edge portion to deteriorate the surface smoothness unlike the conventional color filter substrate, it can exhibit its leveling ability, effectively to improve the surface smoothness of the pixel portion.

As described above, the improvement of the surface smoothness of a color filter substrate is a very critical matter for ameliorating and improving the optical characteristics as well as display quality of a color liquid crystal display device. In order to further improve the smoothness, there is a method of polishing the surface of the color filter substrate. Since the overlapped portion of the coloring layers is highest in the color filter substrate of the present invention, the surface smoothness of most pixel portions including the pixel center portion can be improved by polishing this portion without varying its thickness. In this case, since it is not necessary to polish even the lowest portion of the concave portion formed in the pixel edge portion unlike the conventional color filter substrate, the thickness of the coloring layer itself is not varied and thus the variation of the hue and characteristics of the color filter substrate is avoided. Also, since the surface of the overcoat layer is highest in the overlapped portion of the coloring layers in the color filter substrate of the present invention, the surface smoothness of most pixel portions including the pixel center portion can be improved by polishing this portion without varying its thickness. Also, in this case, since it is not necessary to polish even the lowest portion of the concave portion formed in the pixel edge portion unlike the conventional color filter substrate, the thickness of the coloring layer itself is not varied and thus the variation of the hue and characteristics of the color filter substrate is avoided.

It is preferred that each of the coloring layers having two or more different colors be formed in each color by a photolithography process using a material containing at least the corresponding coloring matter and a photo-sensitive resin. In the photolithography process, the formation precision of the pixel depends upon the formation precision of the photomask, the development contrast of the photo-sensitive material and the precision of the exposure device, but it is possible to provide a precision of ±2 $\mu$m from the designed value. Although the coloring layer can be formed by a printing method, a waving phenomenon from approximately 20 $\mu$m to 25 $\mu$m may occur in the pixel edge portion in this case, and therefore on the light-shading member it is difficult to precisely form the overlapped portion having a width of from 2 $\mu$m up to the width of the light-shading member.

The color liquid crystal display device of the present invention uses the color filter substrate of the present invention. A concave portion can be eliminated in the pixel edge portion of the color filter substrate by overlapping the edge portions of the adjacent barrel-shaped coloring layers to raise the pixel edge portion and adjusting the width of the overlapped portions. Since the cell thickness is not increased in the concave portion of the pixel edge portion unlike the conventional color filter substrate and a difference in the V–T curve does not occur even by applying a liquid crystal driving voltage, it is possible to prevent the reduction of the contrast as well as display quality. Also, the extension of the tailing region of the overlapped portion can be adjusted by controlling the overlapped width of the coloring layer on the light-shading member. Thus, it is possible to control the smoothness of the entire portion which will be the liquid crystal-lighting region when applying a liquid crystal driving voltage. Also, the formation of the overcoat layer on the coloring layer will smooth the surface of the color filter substrate in the entire pixel portion as effectively exhibiting the leveling ability, and also reduce a difference in the heights of the pixel center portions between the adjacent coloring layers. Moreover, since it is not necessary to polish even the lowest portion of the concave portion in polishing the surfaces of the coloring layer and the overcoat layer unlike the conventional color filter substrate, the surface smoothness of most portions of the pixel portion including the pixel center portion can be improved without the variation of the characteristics.

Especially, the variation of the cell thickness and the uniformity of the surface largely affect the optical characteristics as well as display quality of a STN-type liquid crystal, but it is possible to adjust the difference in level of the adjacent coloring layers to 0.01 $\mu$m or less and to maximize the leveling ability of the overcoat layer in the color filter substrate. Therefore, the color filter substrate of the present invention can provide a uniform surface with no concave portion in the liquid crystal-lighting display region, and meet a demand for high speed response in a STN-type liquid crystal display device.

Figure 15:
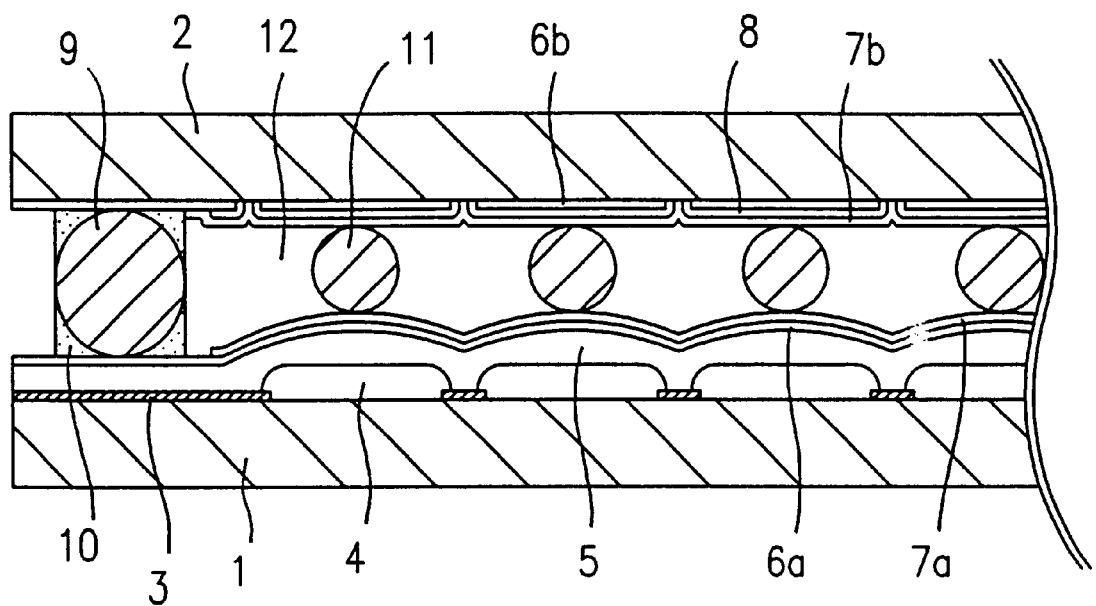
FIG. 15 is a sectional view showing the conventional color liquid crystal display device.
Figure 16A:
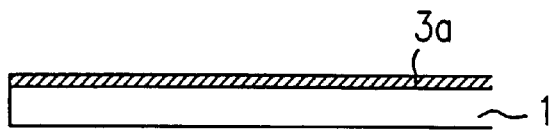
FIGS. 16A through 16I are sectional views showing a process for manufacturing the conventional color filter substrate.
Figure 16B:
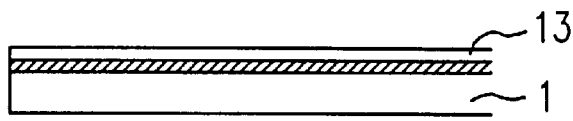
Figure 16C:
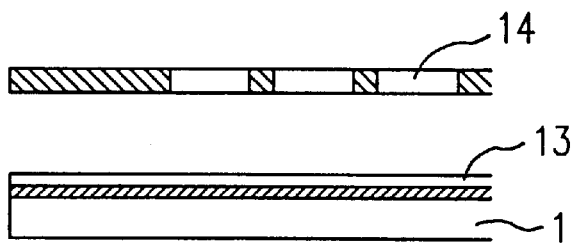
Figure 16D:
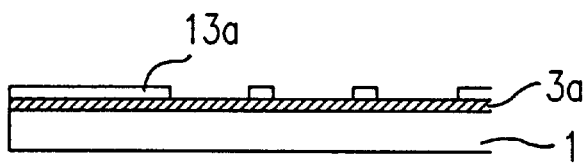
Figure 16E:
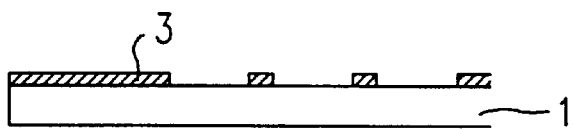
Figure 16F:
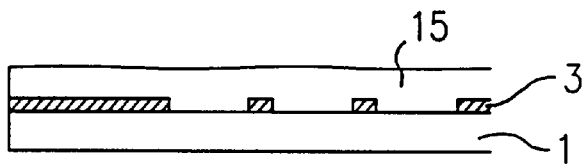
Figure 16G:
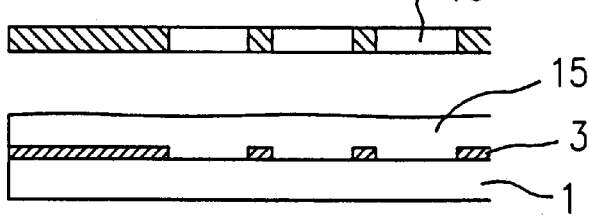
Figure 16H:
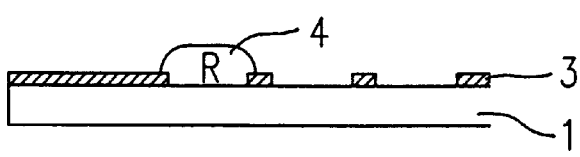
Figure 16I:
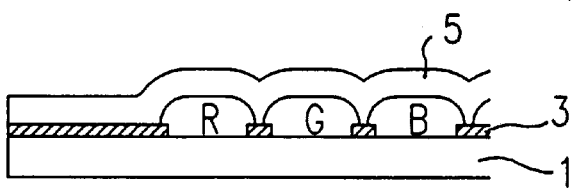
Figure 17A:
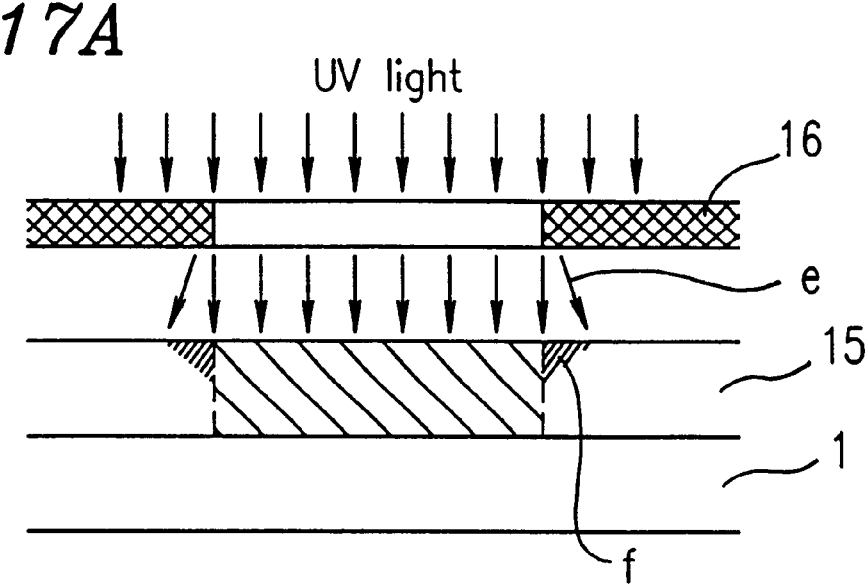
FIGS. 17A through 17C are sectional views showing the surface and section of the coloring layer of the color filter substrate formed by a photolithography process.
Figure 17B:
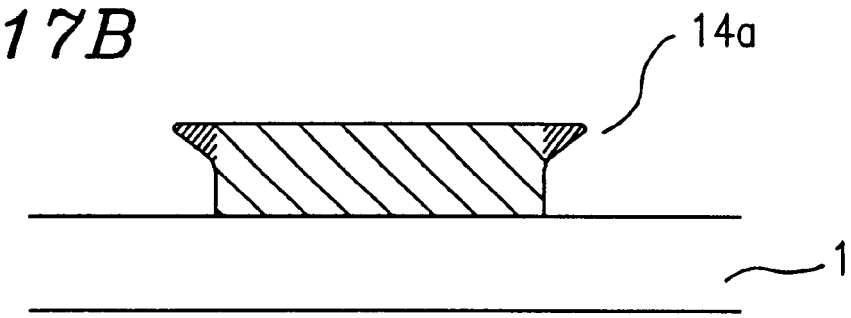
Figure 17C:
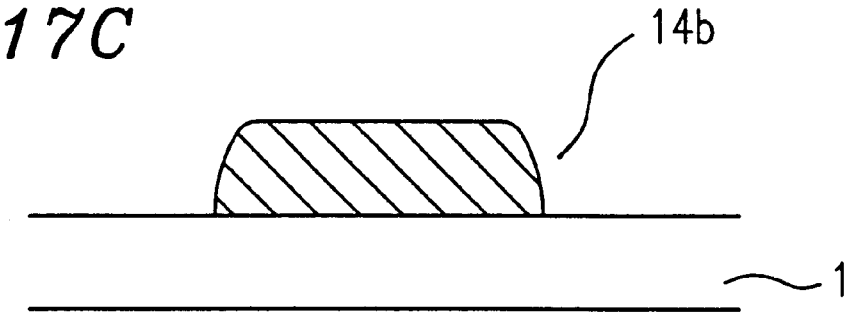
Figure 18:
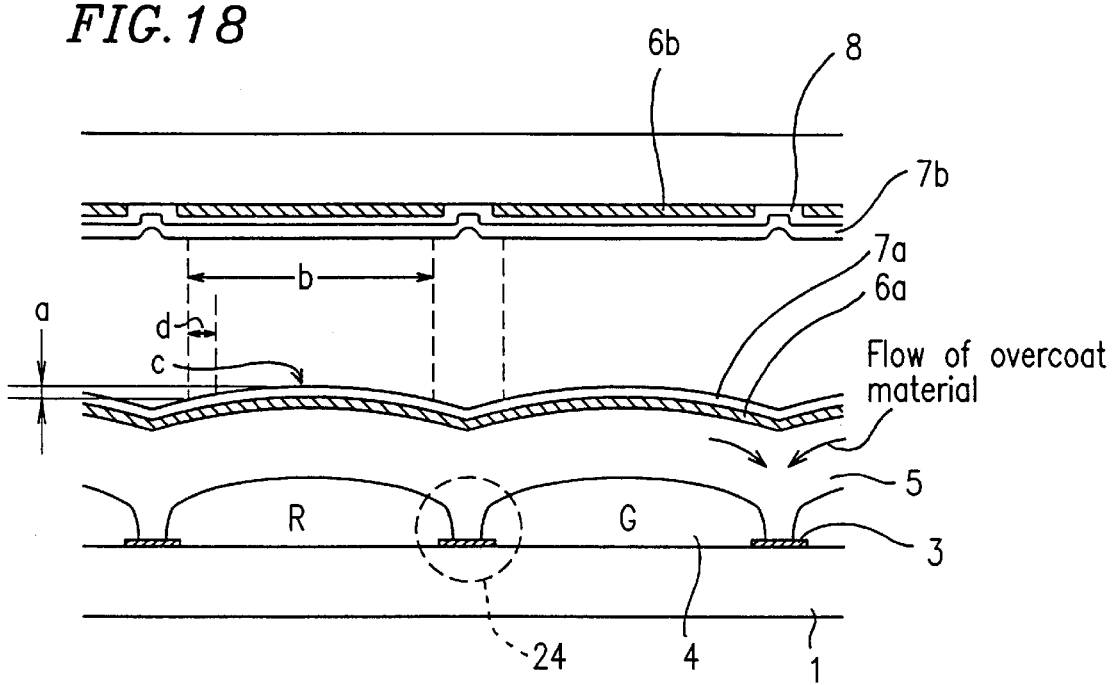
FIG. 18 is a sectional view showing the conventional color liquid crystal display device.
Figure 19:
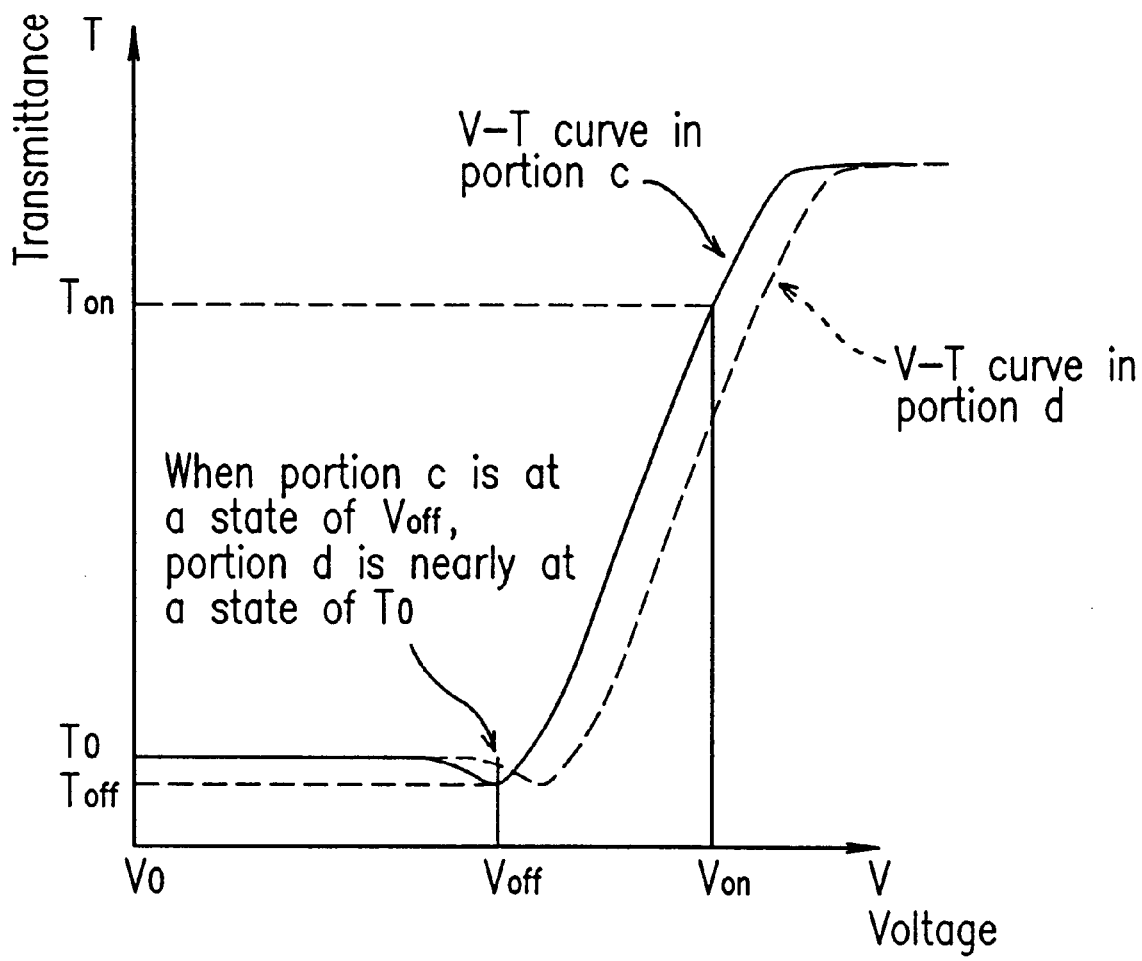
FIG. 19 is a graph showing the V–T characteristic of the conventional color liquid crystal display device.

The color filter substrate can be manufactured for example as follows, but the formation of the light-shading member (the black mask) can be made in the same manner as the conventional process shown in FIGS. 16A to 16I, and therefore its illustration is omitted here. The film thickness of the black mask is 1000 angstroms in FIGS. 16A to 16I, but it is preferred in this case that the film thickness be 1 $\mu$m or less or 0.5 $\mu$m or less. Also, in FIGS. 3A to 3G or later, the same numbers and symbols are designated to portions having similar functions to those of the conventional ones shown in FIGS. 15 and 18.

Figure 3A:
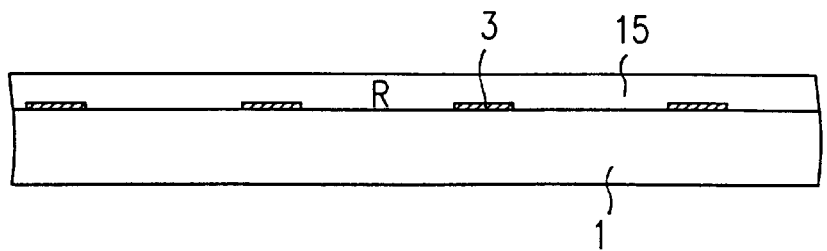
FIGS. 3A through 3G are sectional views showing a process for manufacturing the color filter substrate of the present invention.
Figure 3B:
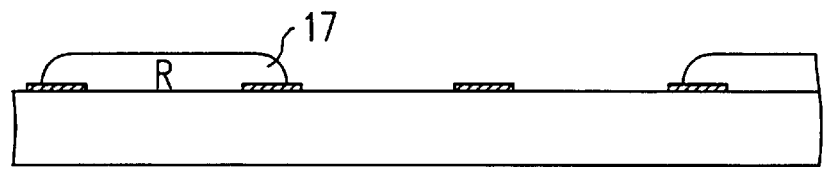

First, as shown in FIG. 3A, the first coloring layer R (red) 15 is formed on the whole surface of a transparent substrate 1 on which a black mask 3 is formed, and exposed and developed using a photomask to provide a coloring layer 17 corresponding to an R pixel, as shown in FIG. 3B.

Figure 3C:
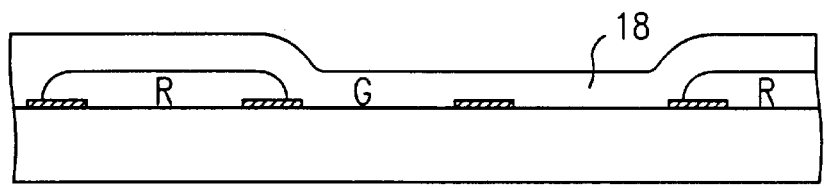
Figure 3D:
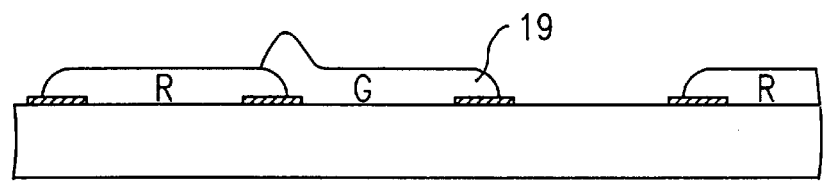

Then, as shown in FIG. 3C, the second coloring layer G (green) 18 is formed on the whole surface of the transparent substrate 1, and exposed and developed using a photomask to provide a coloring layer 19 corresponding to a G pixel, as shown in FIG. 3D. At this time, the design of the photomask is adjusted so that the edge portion of the G coloring layer 19 is overlapped with the edge portion of the R coloring layer 17 on the black mask 3.

Figure 3E:
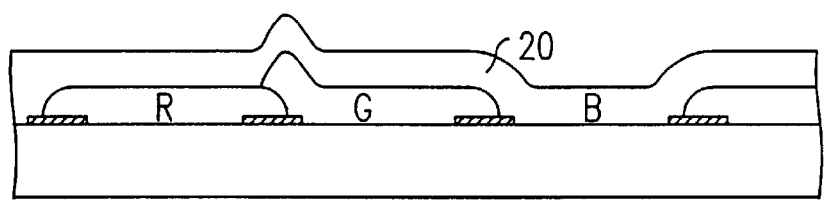
Figure 3F:
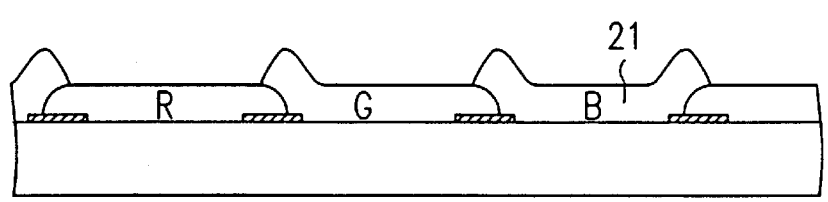

Subsequently, as shown in FIG. 3E, the third coloring layer B (blue) 20 is formed on the whole surface of the transparent substrate 1, and exposed and developed using a photomask to provide a coloring layer 21 corresponding to a B pixel, as shown in FIG. 3F. At this time, the design of the photomask is adjusted so that the edge portion of the B coloring layer 21 is overlapped with both the edge portion of the R coloring layer 17 and the edge portion of the G coloring layer 19 on the black mask 3. Thus, adjacent edge portions of the R coloring layer 17, the G coloring layer 19 and the B coloring layer 21 are overlapped with each other to provide a convex overlapped portion.

Figure 3G:
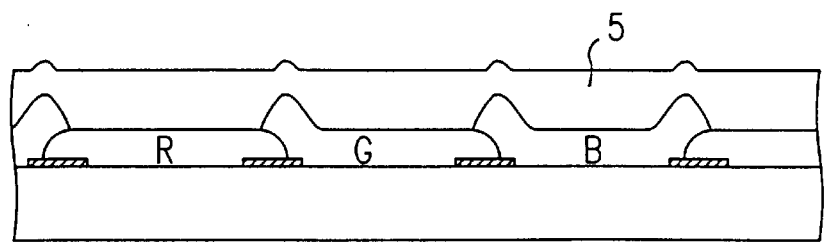

Thereafter, as shown in FIG. 3G, an overcoat layer 5 is applied to cover the coloring layers 17, 19 and 21. Thus, a portion of the overcoat layer 5 on the overlapped portion of the R coloring layer 17, the G coloring layer 19 and the B coloring layer 21 forms a convex portion.

Additionally, the coloring layers of the color filter substrate may be formed by a printing method. In this case, since the coloring layers are printed in a dot state on the substrate, the exposure and development steps are unnecessary.

Embodiment 1

FIG. 4 is a sectional view showing the color liquid crystal display device of Embodiment 1.

This color liquid crystal display device comprises a color filter substrate in which the edge portions of the adjacent coloring layers 4 corresponding to each of the pixels R, G and B are overlapped with each other on a light-shading member (a black mask) 3. The edge portions of the coloring layer 4 form convex portions in the overlapped portions, and a portion of an overcoat layer 5 formed thereon flows from the convex portion of the coloring layer 4 into the pixel center portion to provide a smooth surface in a liquid crystal-lighting display region b with a convex portion formed only on the convex portion of the coloring layer 4.

This color filter substrate is manufactured as follows.

Figure 5:
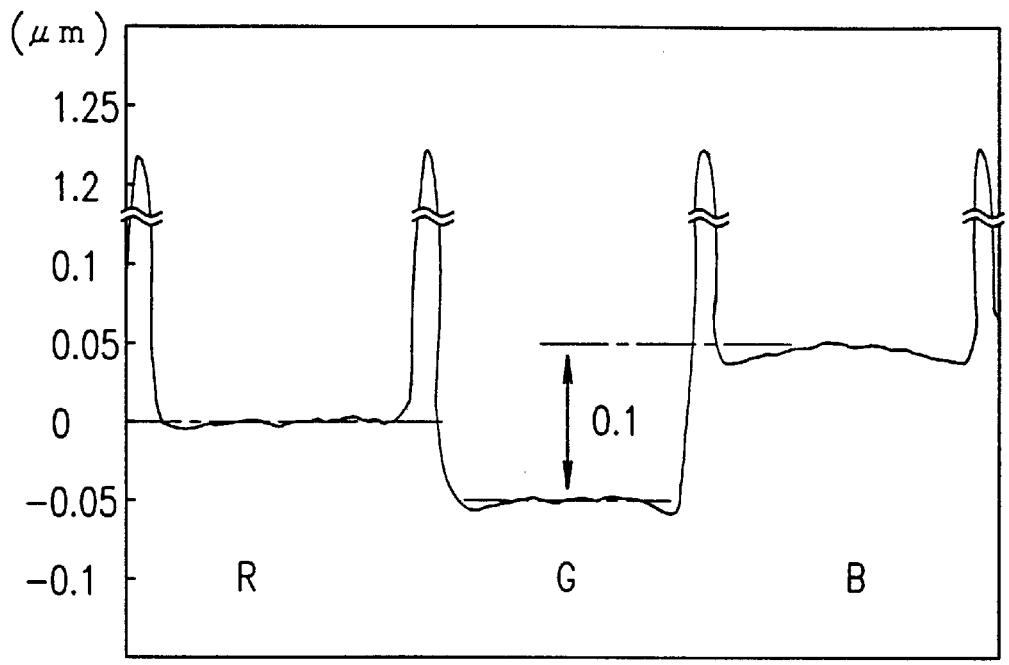
FIG. 5 is a sectional view showing the coloring layer of the color filter substrate of the present invention.

First, on a glass substrate 1 having a black mask 3 formed with a thickness of 0.12 $\mu$m and a width of 20 $\mu$m, the coloring layers 4 corresponding to each of the pixels R, G and B are formed using a film having an original film thickness of 2 $\mu$m and a post-baking film thickness of 1.5 $\mu$m is formed by a film laminate method so that the width of the overlapped portion is about 2 $\mu$m. Its sectional shape is as shown in FIG. 5, and the height of the overlapped portion is about 1.2 to 1.25 $\mu$m with the maximum difference in level between each pixel being 0.1 $\mu$m.

Figure 6:
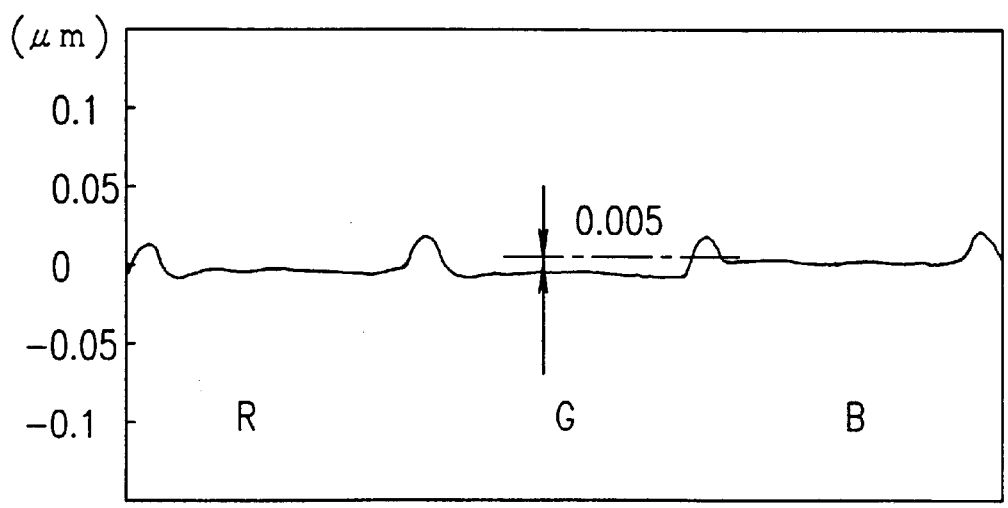
FIG. 6 is a sectional view showing the overcoat layer of the color filter substrate of the present invention.

Then, an acrylic overcoat material manufacture by Nihon Gosei Gomu is coated on the coloring layer 4 by a spin coating method to form an overcoat layer 5. Its sectional shape is as shown in FIG. 6, and the maximum difference in level between each pixel measured with a palpation meter is 0.005 $\mu$m which provides a good surface smoothness.

This color filter substrate is modulated with a SVGA panel system having a rubbing angle of 260°, a cell thickness of 6 $\mu$m and a liquid crystal $\alpha$ value of 1.035 to fabricate a color liquid crystal display device. When the optical characteristics as well as display quality of the resulting color liquid crystal display device are measured, it provides a uniform display quality with a contrast of 40:1 (1.3-fold higher than the conventional one), and a brightness of 96 cd/cm$^2$ (a panel transmittance of 4.8%).

Embodiment 2

The color filter substrate of Embodiment 1 is modulated with a SVGA panel system having a rubbing angle of 260°, a cell thickness of 6 $\mu$m and a liquid crystal $\alpha$ value of 1.026 to fabricate a color liquid crystal display device. When the optical characteristics as well as display quality of the resulting color liquid crystal display device are measured, it provides a uniform display quality with a contrast of 55:1 (1.4-fold higher than the conventional one), and a brightness of 108 cd/cm$^2$ (a panel transmittance of 5.4%).

Embodiment 3

The color filter substrate of Embodiment 1 is modulated with a panel system having a rubbing angle of 260°, a cell thickness of 4.5 $\mu$m and a liquid crystal a value of 1.030 to fabricate a color liquid crystal display device. When the optical characteristics as well as display quality of the resulting color liquid crystal display device are measured, it provides a uniform display quality with a contrast of 30:1 (1.5-fold higher than the conventional one), a brightness of 90 cd/cm$^2$ (a panel transmittance of 4.5%), and a response speed of 120 ms.

Embodiment 4

The color filter substrate of Embodiment 1 is modulated with a panel system having a rubbing angle of 240°, a cell thickness of 6.5 $\mu$m and a liquid crystal a value of 1.035 to fabricate a color liquid crystal display device. Because a 240° twisted alignment film material has a lower tilt angle than a 260° twisted alignment film material, the display quality will be largely affected by the unevenness of the substrate. However, when the optical characteristics as well as display quality of the resulting color liquid crystal display device in this embodiment are measured, it provides a uniform display quality with a contrast of 50:1 (1.25-fold higher than the conventional one), and a brightness of 108 cd/cm$^2$ (a panel transmittance of 5.2%).

Embodiment 5

A 1024×768 XGA color filter substrate is manufactured by the same procedure as in Embodiment 1, and the color filter substrate is modulated with a panel system having a rubbing angle of 260°, a cell thickness of 6 $\mu$m and a liquid crystal $\alpha$ value of 1.035 to fabricate a color liquid crystal display device. When the optical characteristics as well as display quality of the resulting color liquid crystal display device are measured, it provides a uniform display quality with a contrast of 35:1 (1.4-fold higher than the conventional one), and a brightness of 80 cd/cm$^2$ (a panel transmittance of 4.0%).

Embodiment 6

The color filter substrate of Embodiment 1 is modulated with a panel system having a rubbing angle of 260°, a cell thickness of 5.0 $\mu$m and a liquid crystal a value of 1.035 to fabricate a color liquid crystal display device. When the optical characteristics as well as display quality of the resulting color liquid crystal display device are measured, it provides a uniform display quality with a contrast of 50:1, a brightness of 90 cd/cm$^2$ (a panel transmittance of 4.5%) and a response speed of 100 ms. Therefore, it can be adapted for multimedia (animation, etc.) such as notebook-type personal computers, and the like, as an STN color liquid crystal display device.

Embodiment 7

In this embodiment, instead of the thermosetting-type overcoat material used in Embodiment 1, a JSR photosensitive thermosetting-type overcoat material is coated to form an overcoat layer in order to further improve the surface smoothness of the color filter substrate of Embodiment 1.

Figure 7A:
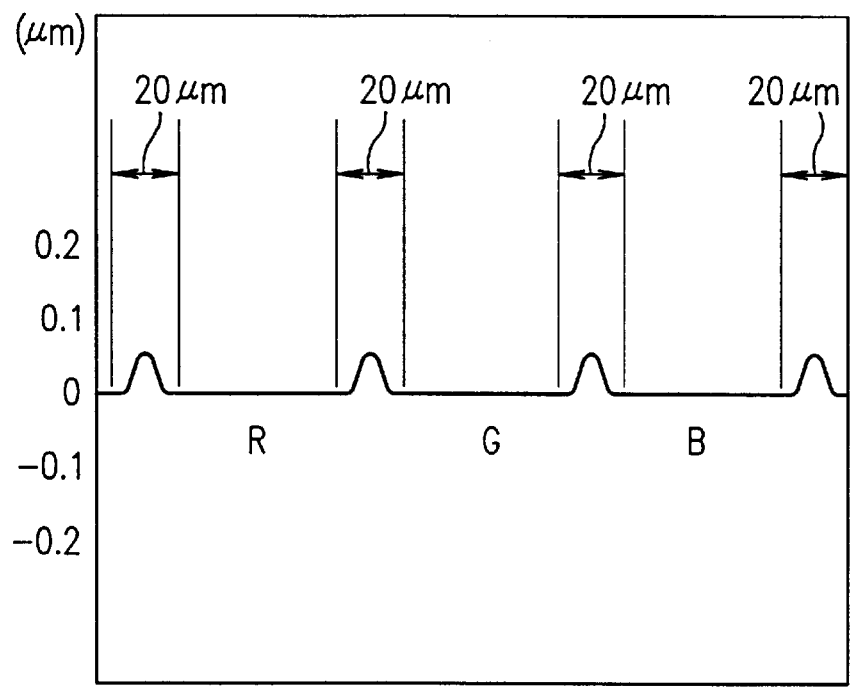
FIGS. 7A and 7B are sectional views showing the coloring layers of Embodiments 1 and 7.

The sectional shape of the coloring layers in the color filter substrate of this embodiment is as shown in FIG. 7A. In this case, the surface of the pixel portion is as smooth as in Embodiment 1, but the boundary between the overlapped portion of the coloring layers and the pixel portion is at a sharp angle, and a smooth portion is extended toward the black mask side (a region having a width of 20 $\mu$m). Therefore, it is possible to further improve the aperture ratio of the pixel by further narrowing the width of the black mask.

Figure 7B:
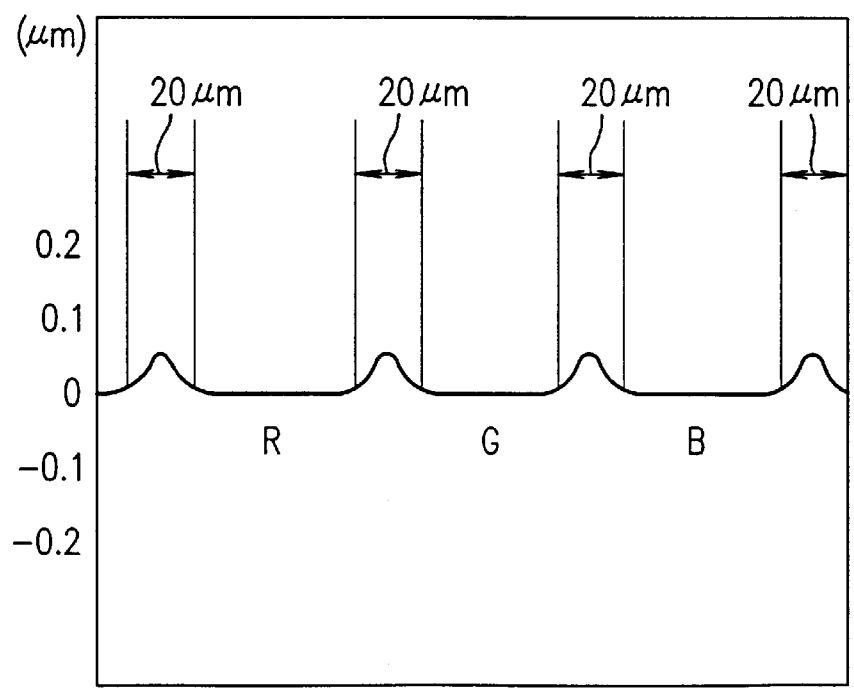

On the other hand, the sectional shape of the color filter substrate of Embodiment 1 on which the thermosetting-type overcoat material is coated is as shown in FIG. 7B. In this case, the pixel portion other than the black mask portion (a region having a width of 20 $\mu$m) is uniform and smooth, but the boundary between the overlapped portion of the coloring layers and the pixel portion is tailing. Therefore, the color filter substrate provides a good display property as such, but when an attempt is made to improve the aperture ratio of the pixel, the liquid crystal-lighting display region is overlapped with this tailing region, which leads to the reduction of the characteristics.

Comparative Example 1

Figure 20:
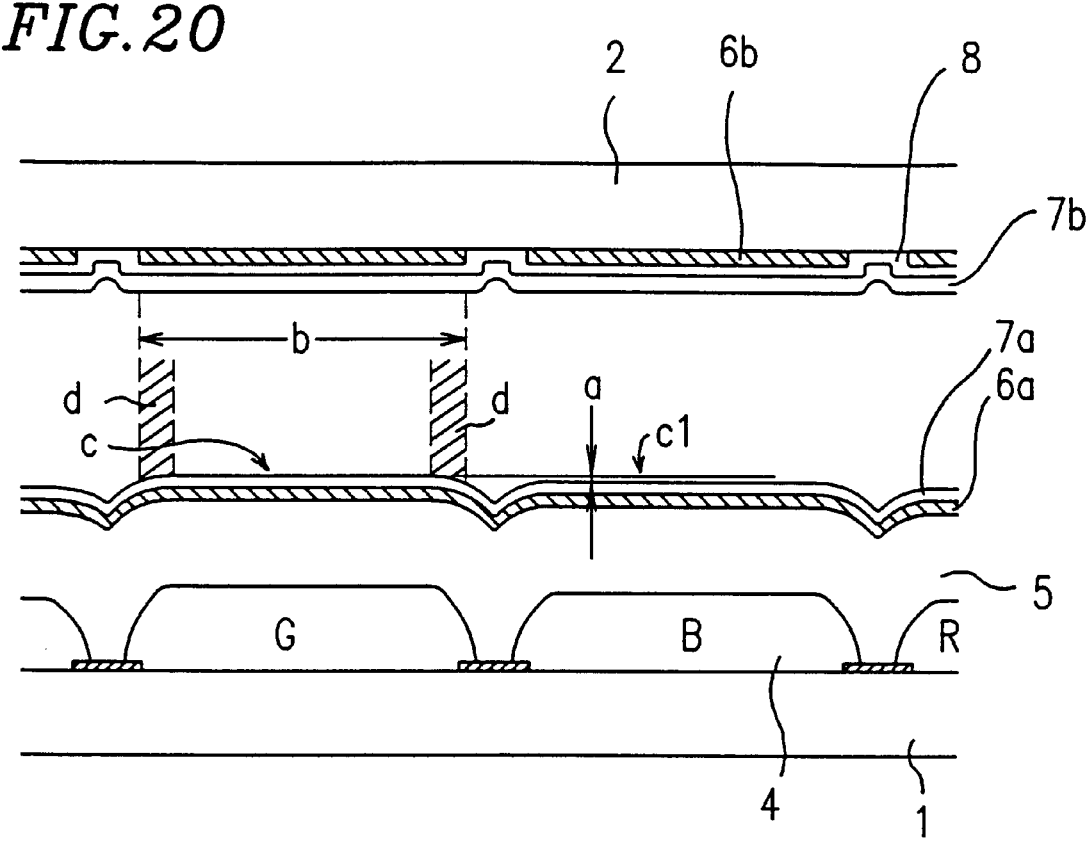
FIG. 20 is a sectional view showing the color liquid crystal display device of a comparative example.

FIG. 20 is a sectional view showing the color liquid crystal display device of Comparative Example 1.

The adjacent coloring layers 4 corresponding to each of the pixels R, G and B of this color liquid crystal display device are formed as leaving a space. An overcoat layer 5 formed thereon flows into a gap between the coloring layers to provide a concave portion in the pixel edge portion.

This color filter substrate is manufactured as follows.

Figure 21:
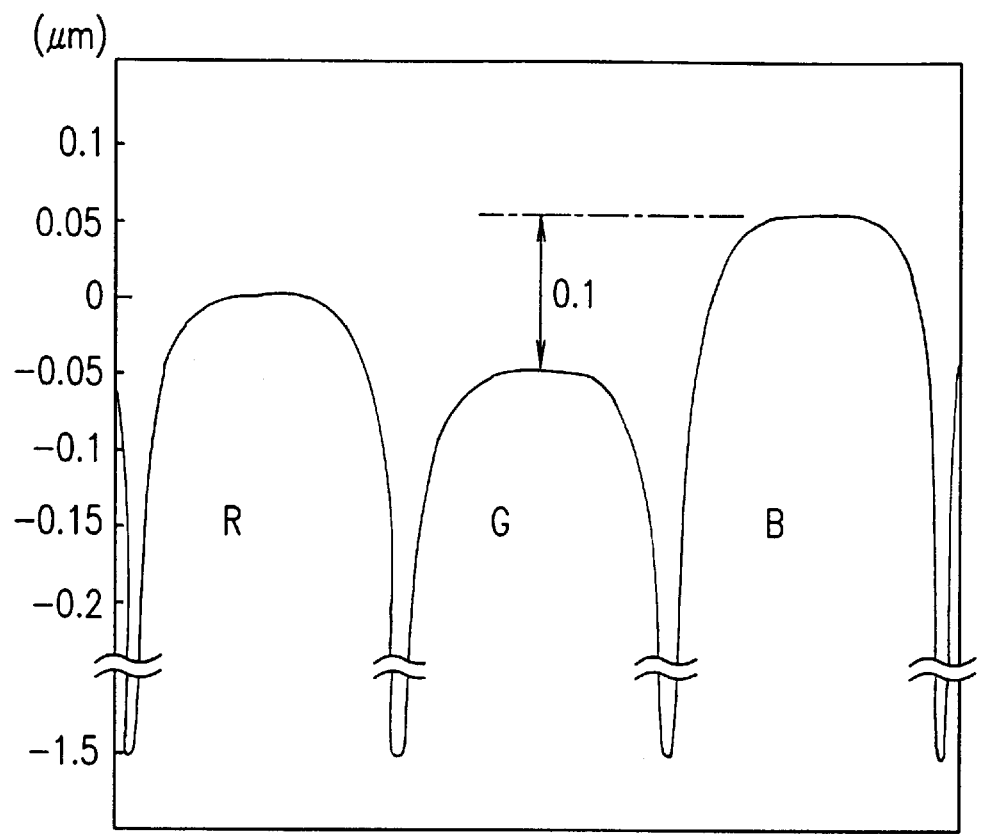
FIG. 21 is a sectional view showing the coloring layer of the color liquid crystal display device of a comparative example.

First, on a glass substrate 1 having a black mask 3 formed, the coloring layers 4 corresponding to each of the pixels R, G and B are formed using the same film as used in Embodiment 1 by a film laminating method. Its sectional shape is as shown in FIG. 21, and the maximum difference in level between each pixel is 0.1 μm.

Figure 22:
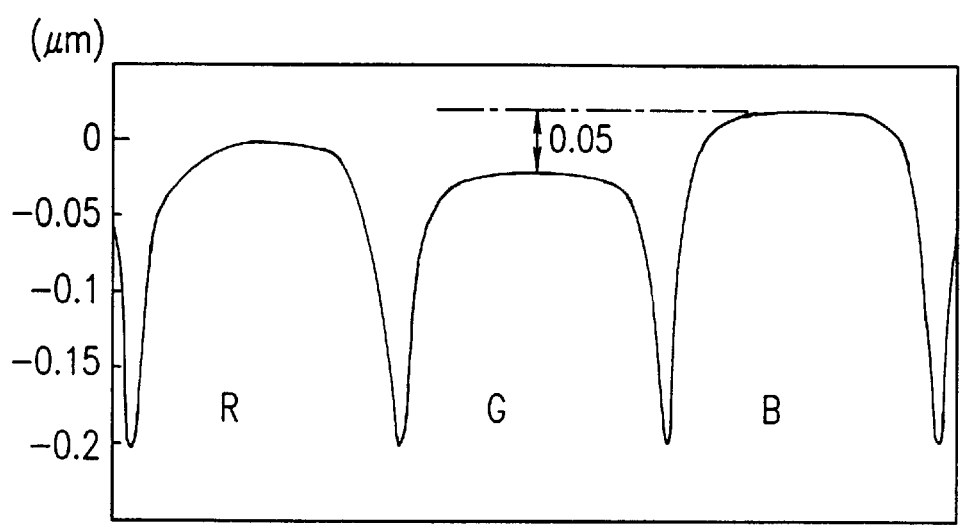
FIG. 22 is a sectional view showing the overcoat layer of the color liquid crystal display device of a comparative example.

Then, the same overcoat material as used in Embodiment 1 is coated on the coloring layers 4 to form an overcoat layer 5. Its sectional shape is as shown in FIG. 22, and the maximum difference in level between each pixel is measured with a palpation meter is 0.05 μm which is greater than that of Embodiment 1.

This color filter substrate is modulated with the same panel as used in Embodiment 1 to fabricate a color liquid crystal display device. When the optical characteristics of the resulting color liquid crystal display device are measured, its contrast is 30:1 which is poorer than that of the color liquid crystal display device of Embodiment 1. This is because the shoulder tailing of the c1 portion in the pixel edge portion shown in FIG. 20 increases locally the cell thickness to cause the light-leaking due to a difference in the V–T characteristic, when the pixel center portion is at a state of $V_{off}$. Also, when its display quality is evaluated, the G color is provided as an ununiform green in the neutral color display. This is because the difference a in level between the G pixel and the B pixel shown in FIG. 20 (between c–c1) is 0.05 μm which reduces the cell thickness in the G pixel.

Comparative Example 2

FIG. 23 is a sectional view showing the color liquid crystal display device of Comparative Example 2.

The adjacent coloring layers 4 corresponding to each of the pixels R, G and B of this color liquid crystal display device are formed as leaving a space, and a black mask 23 is formed therebetween. An overcoat layer 5 formed thereon flows into a gap between the coloring layers 4 and the black mask 23 to provide a concave portion in the pixel edge portion.

This color filter substrate is manufactured as follows.

First, in a glass substrate 1, the coloring layers 4 corresponding to each of the pixels R, G and B are formed using the same film as in Embodiment 1 by a film laminate method. The adjacent coloring layers 4 are spaced at a gap corresponding to the designed value of the black mask 23, and in this comparative example, they are spaced by 25 μm. Then, a film-shaped black mask 23 is formed by a film laminating method, or an ink-shaped black mask 23 is formed by a printing or spin coating method. Its sectional shape is as shown in FIG. 24, and the maximum difference in level between each pixel is 0.1 μm.

Then, an overcoat layer 5 is formed on the coloring layers 4 and the black masks 23 using the same overcoat material as used in Embodiment 1. Its sectional shape is as shown in FIG. 25, and the maximum difference in level between each pixel measured with a palpation meter is 0.03 μm which is greater than that of Embodiment 1.

This color filter substrate is modulated with the same panel as used in Embodiment 1 to fabricate a color liquid crystal display device. When the optical characteristics of the resulting color liquid crystal display device are measured, its contrast is 30:1 which is poorer than that of the color liquid crystal display device of Embodiment 1. This is because the shoulder tailing of the c1 portion in the pixel edge portion shown in FIG. 23 increases locally the cell thickness to cause the light-leaking due to a difference in the V–T characteristic, when the pixel center portion is at a state of $V_{off}$. Also, when its display quality is evaluated, the G color is provided as an ununiform green in the neutral color display. This is because the difference a in level between the G pixel and the B pixel shown in FIG. 23 (between c–c1) is 0.03 μm which reduces the cell thickness in the G pixel.

Comparative Example 3

The color filter substrate of Comparative Example 1 is modulated with the same panel as used in Embodiment 2 to fabricate a color liquid crystal display device. When the optical characteristics of the resulting color liquid crystal display device are measured, its contrast is 40:1 which is poorer than that of the color liquid crystal display device of Embodiment 2 due to the light leaking in the pixel edge portion as with Comparative Example 1. Also, when its display quality is evaluated, an effect of the difference in level between each pixel is more significant than that of Comparative Example 1 which makes it impossible to practically use in the neutral color display due to a severe ununiformity. Also, the same results are obtained when a color liquid crystal display device is manufactured using the color filter substrate of Comparative Example 2.

Comparative Example 4

The color filter substrate of Comparative Example 1 is modulated with the same panel as used in Embodiment 3 to fabricate a color liquid crystal display device. When the optical characteristics of the resulting color liquid crystal display device are measured, its contrast is 25:1 which is poorer than that of the color liquid crystal display device of Embodiment 1 due to the light leaking in the pixel edge portion as with Comparative Example 1. Also, when its display quality is evaluated, an effect of the difference in level between each pixel is more significant than that of Comparative Example 1 which makes it impossible to practically use in the neutral color display due to a severe ununiformity. Also, the same results are obtained, when a color liquid crystal display device is manufactured using the color filter substrate of Comparative Example 2.

Comparative Example 5

The color filter substrate of Comparative Example 1 is modulated with the same panel as used in Embodiment 4 to fabricate a color liquid crystal display device. When the optical characteristics of the resulting color liquid crystal display device are measured, its contrast is 25:1 which is poorer than that of the color liquid crystal display device of Embodiment 4 due to the light leaking in the pixel edge portion as with Comparative Example 1. Also, its display quality is poor with an ununiformity in the neutral color display.

The liquid crystal display devices of the above-described Embodiment 4 and Comparative Example 5 are evaluated by the following procedure.

Figure 8A:
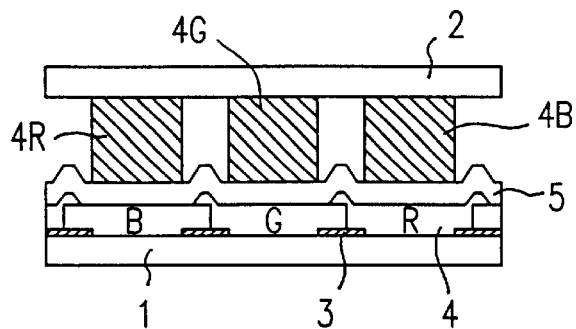
FIGS. 8A and 8B are sectional views showing the liquid crystal display devices of Embodiment 4 and Comparative Example 5.
Figure 8B:
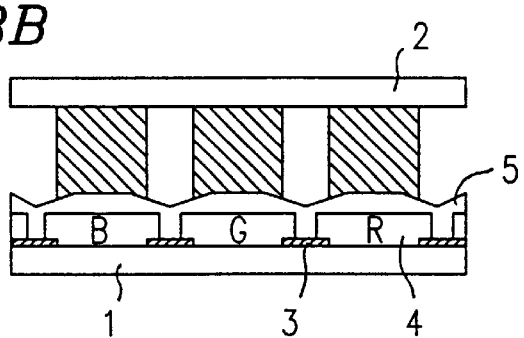
Figure 9A:
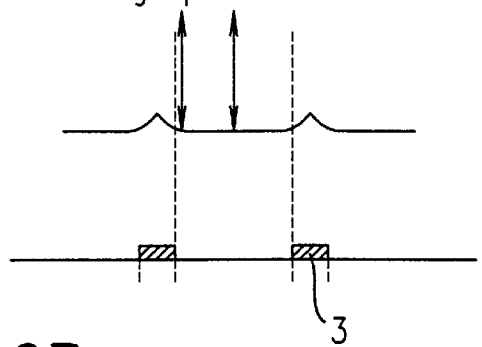
FIGS. 9A and 9B are sectional views showing the overcoat layers of Embodiment 4 and Comparative Example 5 at the time of its formation.
Figure 9B:
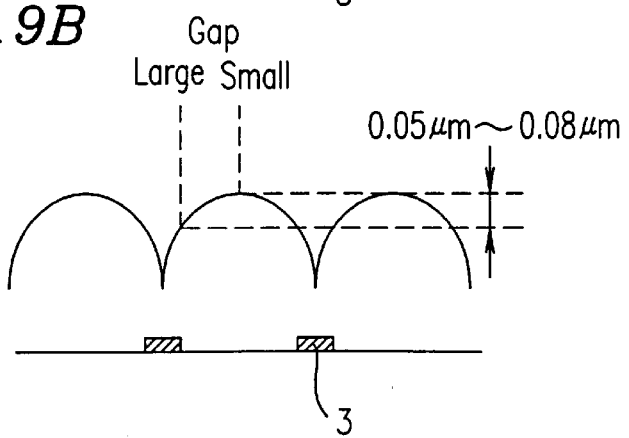
Figure 10A:
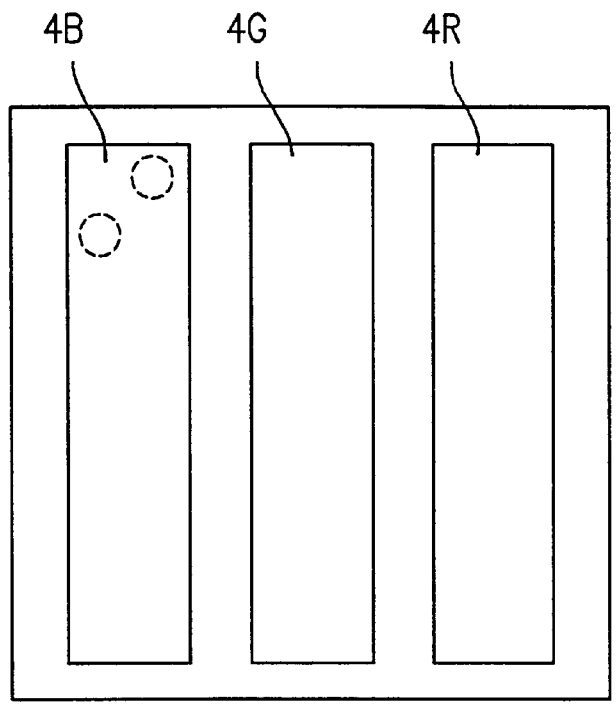
FIGS. 10A and 10B are views showing the light-leaking condition in the peripheries of the color filter substrates of Embodiment 4 and Comparative Example 5.
Figure 10B:
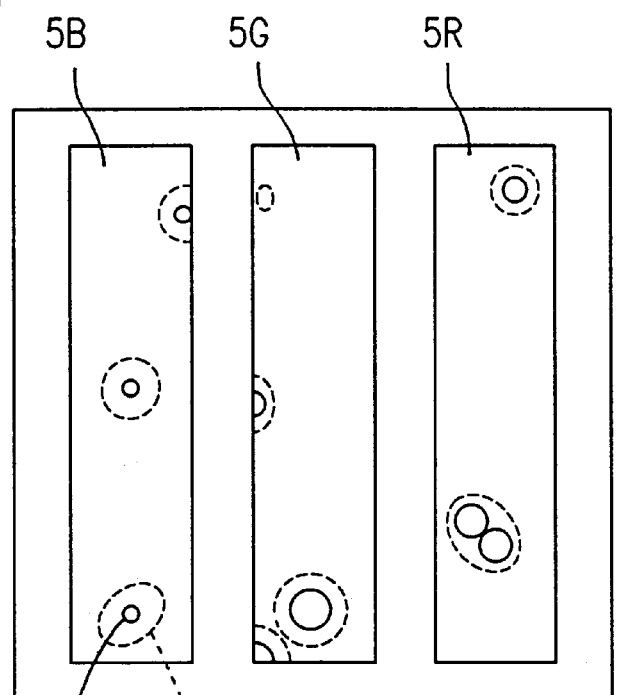

FIGS. 8A, 8B, 9A, 9B, 10A, and 10B are sectional views showing the liquid crystal display devices, sectional views showing the overcoat layers at the time of its formation, and views showing the light-leaking of the color filter substrates in the edge portions, respectively. In each figure, A and B represent those of Embodiment 4 and Comparative Example 5, respectively. In FIGS. 10A and 10B, portions surrounded by bald line are those in which a light-leaking is observed, while portions surrounded by dotted line are those having thinner colors. Also, the portions 4R, 4G and 4B of FIG. 10A correspond to portions 4R, 4G and 4B of FIG. 8A, respectively, and the portions 5R, 5G and 5B of FIG. 10B correspond to portions 5R, 5G and 5B of FIG. 8B, respectively.

Since a difference in level of the overcoat layer between the center portion and the edge portion of the pixel dot is smaller and the cell gap difference between the edge portion and the center portion is smaller in the liquid crystal display device of Embodiment 4, as shown in FIGS. 8A and 9A, no light-leaking is observed in the edge portions of the color filter layers, as shown in FIG. 10A.

On the other hand, since a difference in level of the overcoat layer between the center portion and the edge portion of the pixel dot is greater and the cell gap difference is as large as 0.05–0.8 $\mu$m in the liquid crystal display device of Comparative Example 5, as shown in FIGS. 5B and 9B, a light-leaking is observed in the edge portions of the color filter layers, as shown in FIG. 10B.

Figure 11A:
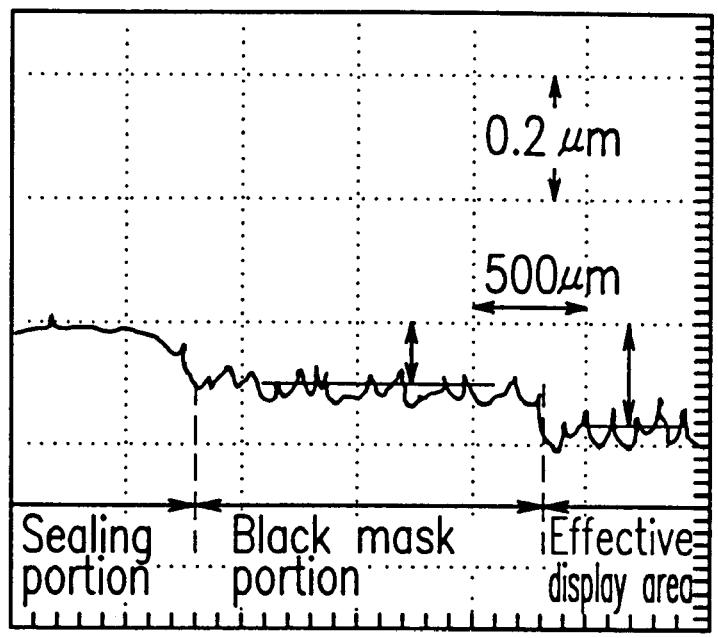
FIGS. 11A and 11B are views showing the results of the sectional shape (the height of the film surface) measured in the vicinity of the sealing portions at the time of the formation of the overcoat layers in Embodiment 4 and Comparative Example 5.
Figure 11B:
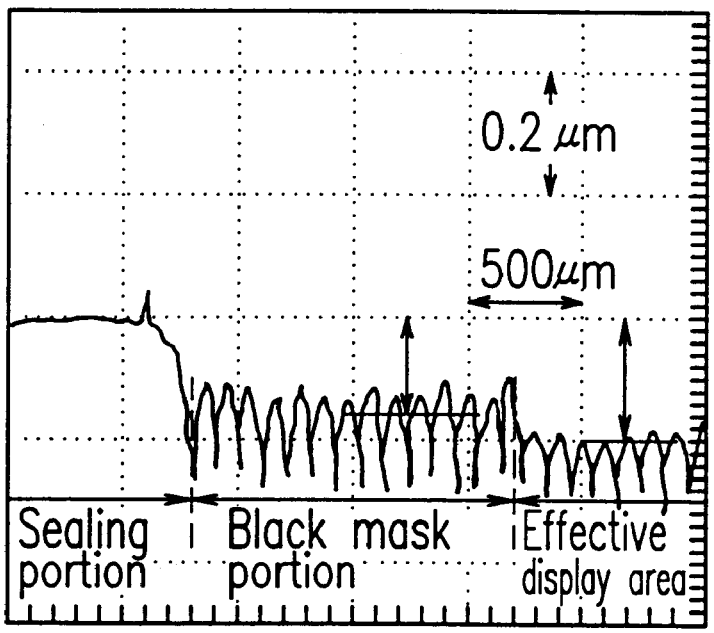
Figure 12:
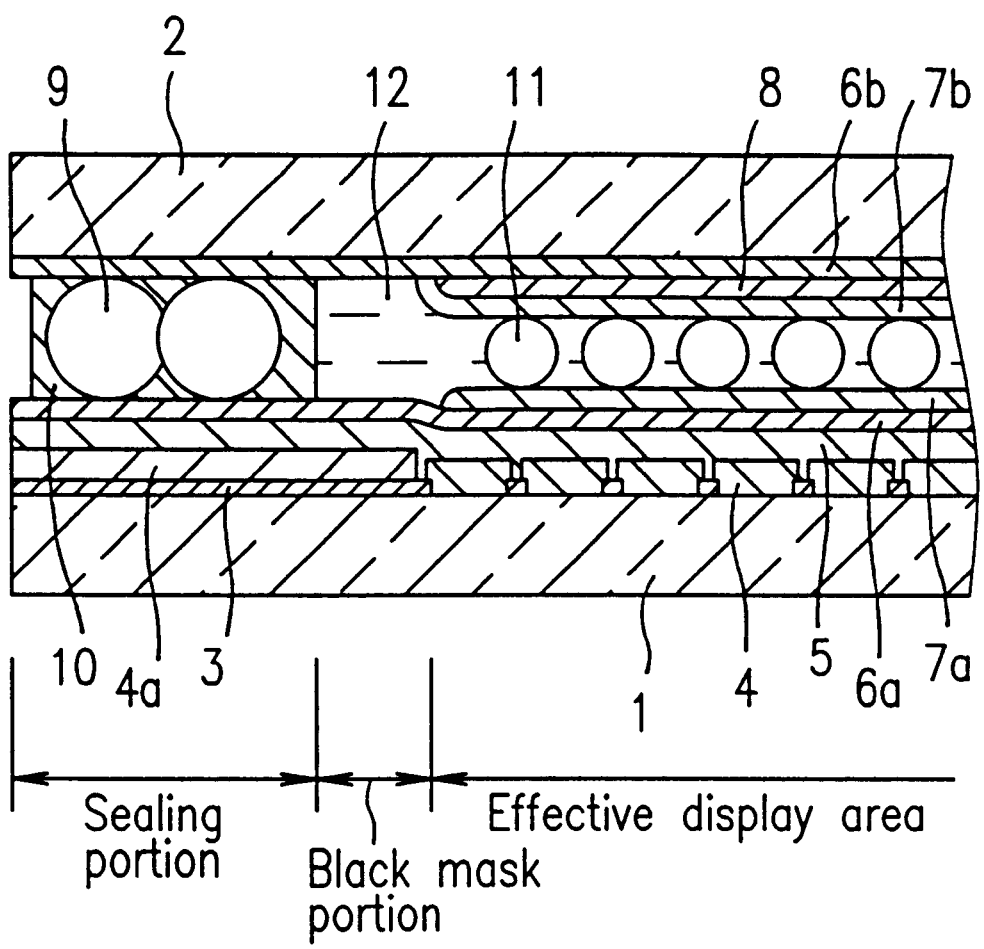
FIG. 12 is a sectional view showing the vicinity of the sealing portion in the liquid crystal display devices of Embodiment 4 and Comparative Example 5.

Also, FIGS. 11A and 11B show the results of the sectional shape (the height of the film surface) measured in the vicinity of the sealing portions at the time of the formation of the overcoat layers in Embodiment 4 and Comparative Example 5, respectively. Additionally, the coloring layer 4a is formed on the black mask 3 of the sealing portion and the black mask portion so as to reduce the difference in level between the effective display area and the sealing portion in Embodiment 4 and Comparative Example 5, as shown in FIG. 12.

As can be seen from FIGS. 11A and 11B, a difference in level between the sealing portion and the effective display area in the color filter substrate of Embodiment 4 is smaller than that of Comparative Example 5. This difference in level leads to a color ununiformity appeared in the vicinity of the sealing portion at the time of the formation of the modules. The generation of the color ununiformity in the vicinity of the sealing portion in Embodiment 4 can be controlled at a much lower level than in Comparative Example 5.

The reason is considered as follows.

The coloring layers of the color filter substrate in the effective display area are concave-shaped in Embodiment 4, as shown in FIG. 8A, and thus when an overcoat material is coated thereon, it does not flow into the unwanted portion. Accordingly, no great difference in level is created between the sealing portion and the effective display area, as shown in FIG. 11A.

On the other hand, the coloring layers of the color filter substrate are convex-shaped in Comparative Example 5, as shown in FIG. 8B, and thus when an overcoat material is coated thereon, it flows into the concave portion where no coloring layers are formed to raise the film reduction percentage. Accordingly, a great difference in level is created between the sealing portion and the effective display area, as shown in FIG. 11B.

Figure 13A:
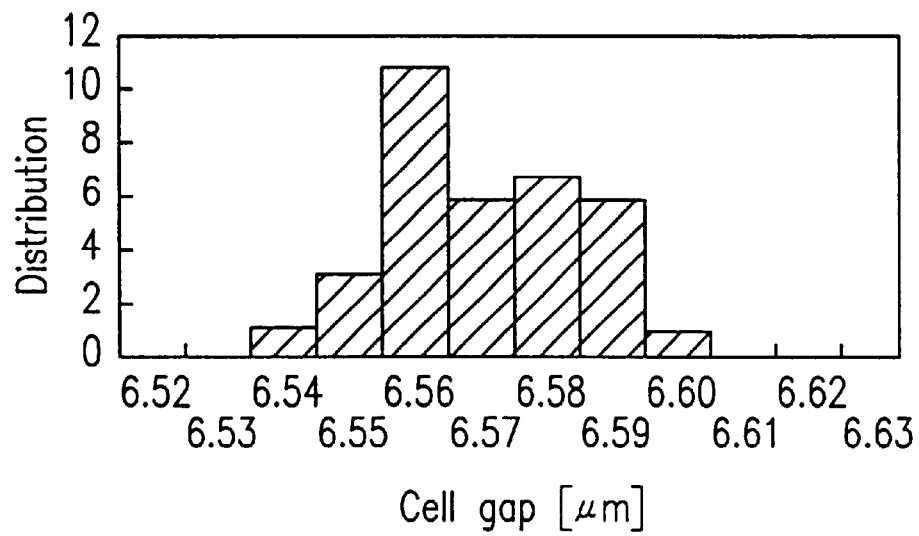
FIG. 13A through 13C are views showing the results comparing the cell gap distributions in each cell in Embodiment 4 and Comparative Example 5.
Figure 13B:
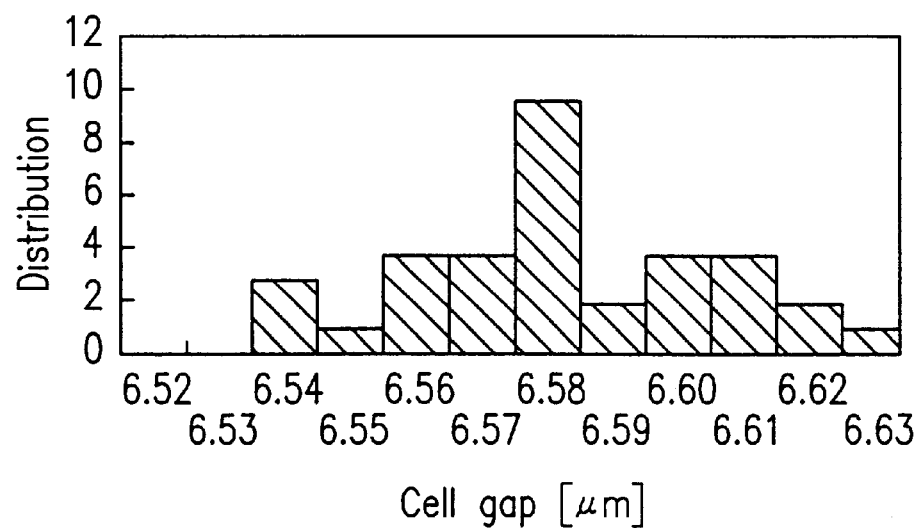

Also, FIGS. 13A and 13B show cell gap distributions in the liquid crystal display devices of Embodiment 4 and Comparative Example 5, respectively. Additionally, the measurement is made at 35 points in each cell, as shown in FIG. 13C.

Figure 13C:
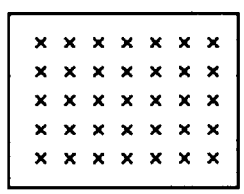

As can be seen from FIGS. 13A, 13B, and 13C the liquid crystal display device of Embodiment 4 has less variation in the cell gap than that of Comparative Example 5. This is because the coloring layers of the color filter substrate are overlapped in Embodiment 4 to provide the improved surface smoothness at the time of the formation of the overcoat layer, compared to that of Comparative Example 5.

Figure 14:
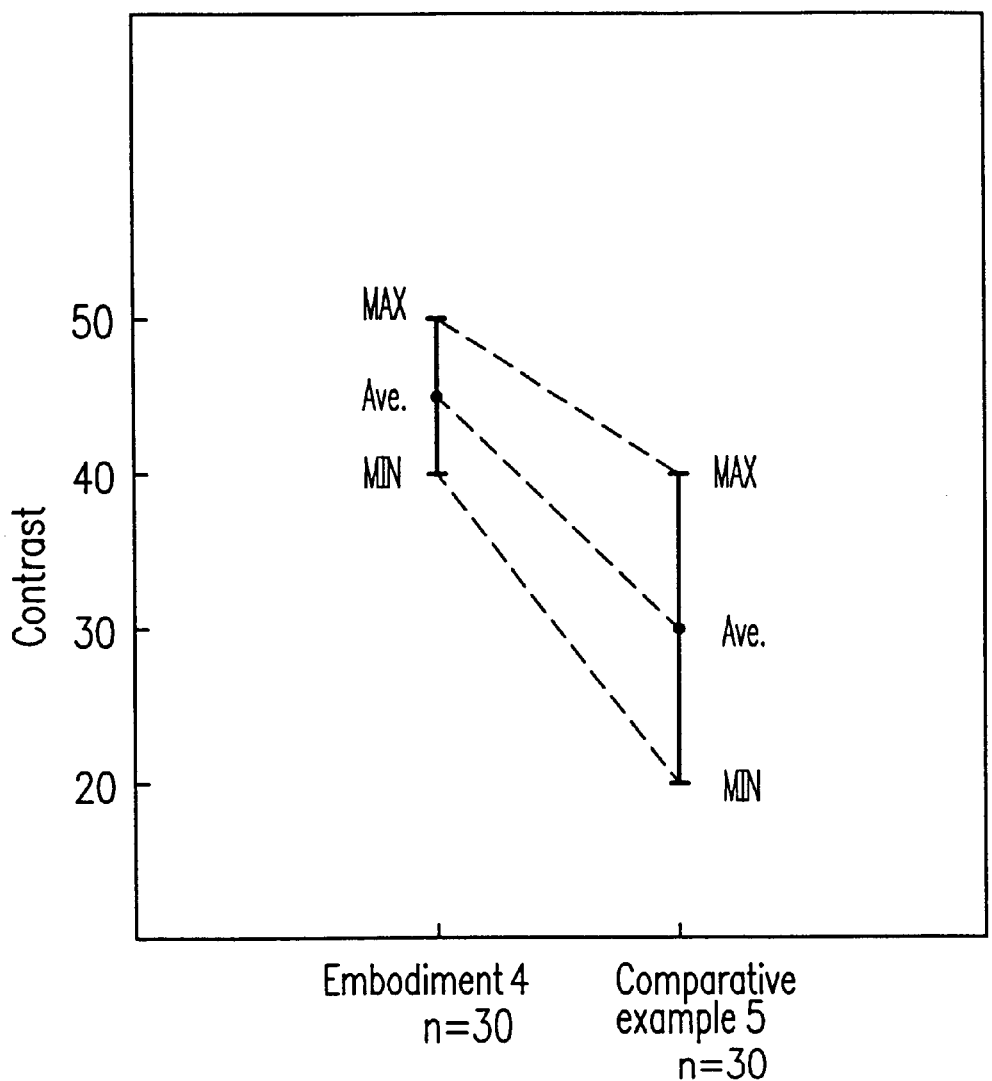
FIG. 14 is a view showing the results of the contrast characteristic evaluation in the liquid crystal display devices of Embodiment 4 and Comparative Example 5.

Moreover, FIG. 14 shows the results of the contrast characteristic evaluation in the liquid crystal display devices of Embodiment 4 and Comparative Example 5. Additionally, the evaluation is made in 30 sets each of the liquid crystal display devices.

As can be seen from FIG. 14, an average contrast of the liquid crystal display device of Embodiment 4 is 1.5-fold higher than that of Comparative Example 5. Also, because the surface of the color filter substrate in Embodiment 4 is more smooth than that of Comparative Example 5, the variation in its contrast is half of that of Comparative Example 5.

As described above in detail, according to the present invention, it is possible to improve the smoothness and uniformity of the surface of the color filter substrate without any variation of its characteristics. The color filter substrate of the present invention can provide a color liquid crystal display device having excellent optical characteristics such as high contrast, high brightness, high speed response, and the like as well as excellent display quality. Since the color filter substrate can be manufactured by only altering the photomask in the conventional manufacture process of color filter substrates, it does not increase the production cost, or require investment in new equipments, and there is no reduction of the percentage of good items.

Various other modifications will be apparent to and can be readily made by those skilled in the art without departing from the scope and spirit of this invention. Accordingly, it is not intended that the scope of the claims appended hereto be limited to the description as set forth, but rather that the claims be broadly construed.

What is claimed is:

1. A color filter substrate comprising a substrate, coloring layers having at least two different colors provided on said substrate and a smoothing layer covering said coloring layers, wherein the adjacent edge portions of said coloring layers are overlapped with each other, and the height of the overlapped portions is greater than or equal to the height of the other portions of said coloring layers, wherein the overlapped portions are shaded from light by a light-shading member formed on said substrate, the overlapped portions being positioned above said light-shading member, and wherein the whole surface of said smoothing layer, or a surface portion of said smoothing layer other than the surface corresponding to said overlapped portions, is flattened.

2. The color filter substrate according to claim 1, wherein said overlapped portions have a width of 2 $\mu$m or more.

3. The color filter substrate according to claim 1, wherein said light-shading member has a thickness of 1 $\mu$m or less.

4. The color filter substrate according to claim 1, wherein said light-shading member has a thickness of 0.5 $\mu$m or less.

5. The color filter substrate according to claim 1, wherein the whole surface of said coloring layers and said smoothing layer is flattened by polishing said overlapped portion and/or a portion of said smoothing layer formed on said overlapped portion.

6. The color filter substrate according to claim 1, wherein said coloring layers contain coloring materials and a photosensitive resin, and are formed by a repeated photolithography.

7. A color liquid crystal display device, comprising the color filter substrate according to claim 1, a counter substrate spaced apart from said color filter substrate and a liquid crystal layer disposed between said color filter substrate and said counter substrate.

8. The liquid crystal display device according to claim 7, wherein said liquid crystal layer contains a STN-type liquid crystal having a liquid crystal molecule twist angle of 180° to 360°.

9. The color filter substrate according to claim 1, wherein a width of the overlapped portions is set to be equal to or smaller than a width of said light-shading member.

10. The color filter substrate according to claim 1, wherein the overlapped portions are shaded from light by a black mask formed on said substrate.

11. A liquid crystal display device, comprising the color filter substrate according to claim 1, another substrate provided so as to be opposed to said color filter substrate, electrodes provided on inner surfaces of said substrates and a liquid crystal layer disposed between said electrodes, wherein liquid crystal-lighting display regions correspond to crossed regions of said electrodes which are not shaded by said light-shading member.

12. The liquid crystal display device according to claim 11, wherein a thickness of said liquid crystal layer is substantially constant in the liquid crystal-lighting display regions.

13. A liquid crystal display device comprising:
a color filter substrate comprising:
substrate;
coloring layers of at least two different colors formed on said substrate, adjacent edge portions of said coloring layers overlapping each other and the height of the overlapped portions of said coloring layers being greater than or equal to the height of the other portions of said coloring layers; and
a light-shading layer formed on said substrate and including light-shading portions arranged to shade the overlapped portions of said coloring layers from light;
a counter substrate; and
a liquid crystal layer disposed between said color filter substrate and said counter substrate,
wherein the widths of the overlapped portions are 2 micrometers or more.

14. The liquid crystal display device according to claim 13, wherein said coloring layers comprise red, green and blue coloring layers.

15. The liquid crystal display device according to claim 13, wherein said light-shading portions are arranged under the overlapped portions of said coloring layers.

16. The liquid crystal display device according to claim 13, wherein said light-shading portions are arranged above the overlapped portions of said coloring layers.

17. The liquid crystal display device according to claim 13, wherein widths of the overlapped portions of said coloring layers are less than widths of said light-shading portions.

18. The liquid crystal display device according to claim 13, wherein said liquid crystal layer contains an STN-type liquid crystal having liquid crystal molecules with a twist angle of 180° to 360°.

19. A color filter substrate comprising a substrate, coloring layers having at least two different colors provided on said substrate, and a smoothing layer covering said coloring layers, wherein the edge portions of said coloring layers are overlapped with each other, and the height of the overlapped portions is greater than or equal to the height of the other portions of said coloring layers, and wherein the overlapped portions are shaded from light by a light-shading member formed on said substrate, wherein the whole surface of said smoothing layer, or a surface portion of said smoothing layer other than the surface corresponding to said overlapped portions is flattened, and wherein the width of the overlapped portions is 2 $\mu$m or more and the thickness of said light-shading member is 1 $\mu$m or less.

20. A liquid crystal display device comprising:
a color filter substrate comprising:
a substrate;
coloring layers of at least two different colors formed on said substrate, adjacent edge portions of said coloring layers overlapping each other and the height of the overlapped portions of said coloring layers being greater than or equal to the height of the other portions of said coloring layers; and
a light-shading layer formed on said substrate and including light-shading portions arranged to shade the overlapped portions of said coloring layers from light;
a counter substrate; and
a liquid crystal layer disposed between said color filter substrate and said counter substrate,
wherein the widths of the overlapped portions are 2 micrometers or more, and
the coloring layers are not used as spacers for spacing apart said color filter substrate and said counter substrate.

21. The liquid crystal display device according to claim 20, wherein said coloring layers comprise red, green and blue coloring layers.

22. The liquid crystal display device according to claim 20, wherein said light-shading portions are arranged under the overlapped portions of said coloring layers.

23. The liquid crystal display device according to claim 20, wherein said light-shading portions are arranged above the overlapped portions of said coloring layers.

24. The liquid crystal display device according to claim 20, wherein widths of the overlapped portions of said coloring layers are less than widths of said light-shading portions.

25. The liquid crystal display device according to claim 20, wherein said liquid crystal layer contains an STN-type liquid crystal having liquid crystal molecules with a twist angle of 180° to 360°.

* * * * *